US011908098B1

(12) United States Patent
Hutchinson

(10) Patent No.: US 11,908,098 B1
(45) Date of Patent: Feb. 20, 2024

(54) ALIGNING USER REPRESENTATIONS

(71) Applicant: Apple Inc., Cupertino, CA (US)

(72) Inventor: Michael S. Hutchinson, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/370,699

(22) Filed: Sep. 20, 2023

Related U.S. Application Data

(60) Provisional application No. 63/409,459, filed on Sep. 23, 2022.

(51) Int. Cl.
| | |
|---|---|
| G06T 19/00 | (2011.01) |
| G06T 19/20 | (2011.01) |
| G06T 5/00 | (2006.01) |
| G06V 10/24 | (2022.01) |
| G06V 40/16 | (2022.01) |
| G06V 10/54 | (2022.01) |

(52) U.S. Cl.
CPC .............. G06T 19/20 (2013.01); G06T 5/002 (2013.01); G06V 10/24 (2022.01); G06V 10/54 (2022.01); G06V 40/174 (2022.01); G06T 2207/20044 (2013.01); G06T 2207/30201 (2013.01)

(58) Field of Classification Search
None
See application file for complete search history.

(56) References Cited

U.S. PATENT DOCUMENTS

| | | | |
|---|---|---|---|
| 9,036,898 B1* | 5/2015 | Beeler ..................... | G06T 19/20 382/154 |
| 2009/0284529 A1* | 11/2009 | De Aguiar .............. | G06T 7/251 345/474 |
| 2011/0148875 A1* | 6/2011 | Kim ........................ | G06T 13/40 345/420 |
| 2012/0154393 A1* | 6/2012 | Lee .......................... | G06T 7/251 345/419 |
| 2015/0178988 A1* | 6/2015 | Montserrat Mora ... | G06T 17/20 345/420 |
| 2015/0286872 A1* | 10/2015 | Medioni ................... | G06T 7/20 382/103 |
| 2016/0293218 A1* | 10/2016 | Hanis ...................... | G11B 27/28 |
| 2017/0024930 A1* | 1/2017 | Chuang ................... | G06T 7/251 |
| 2018/0012407 A1* | 1/2018 | Chuang ................... | G06T 13/40 |
| 2018/0220125 A1* | 8/2018 | Tamir ...................... | G06T 17/00 |

(Continued)

Primary Examiner — Martin Mushambo
(74) Attorney, Agent, or Firm — Thompson Hine LLP

(57) ABSTRACT

Various implementations disclosed herein include devices, systems, and methods that generate a combined 3D representation of a user based on an alignment based on a 3D reference point. For example, a process may include obtaining a predetermined three-dimensional (3D) representation that is associated with a 3D reference point defined relative to a skeletal representation of the user. The process may further include obtaining a sequence of frame-specific 3D representations corresponding to multiple instants in a period of time, each of the frame-specific 3D representations representing a second portion of the user at a respective instant of the multiple instants in the period of time. The process may further include generating combined 3D representations of the user generated by combining the predetermined 3D representation with a respective frame-specific 3D representation based on an alignment which is based on the 3D reference point.

25 Claims, 17 Drawing Sheets

(56) References Cited

U.S. PATENT DOCUMENTS

| | | | |
|---|---|---|---|
| 2020/0035021 A1* | 1/2020 | Horsman | ............... G06T 15/503 |
| 2020/0368616 A1 | 11/2020 | Delamont | |
| 2021/0142818 A1 | 5/2021 | Edwards et al. | |
| 2022/0005271 A1 | 1/2022 | Chachek | |

* cited by examiner

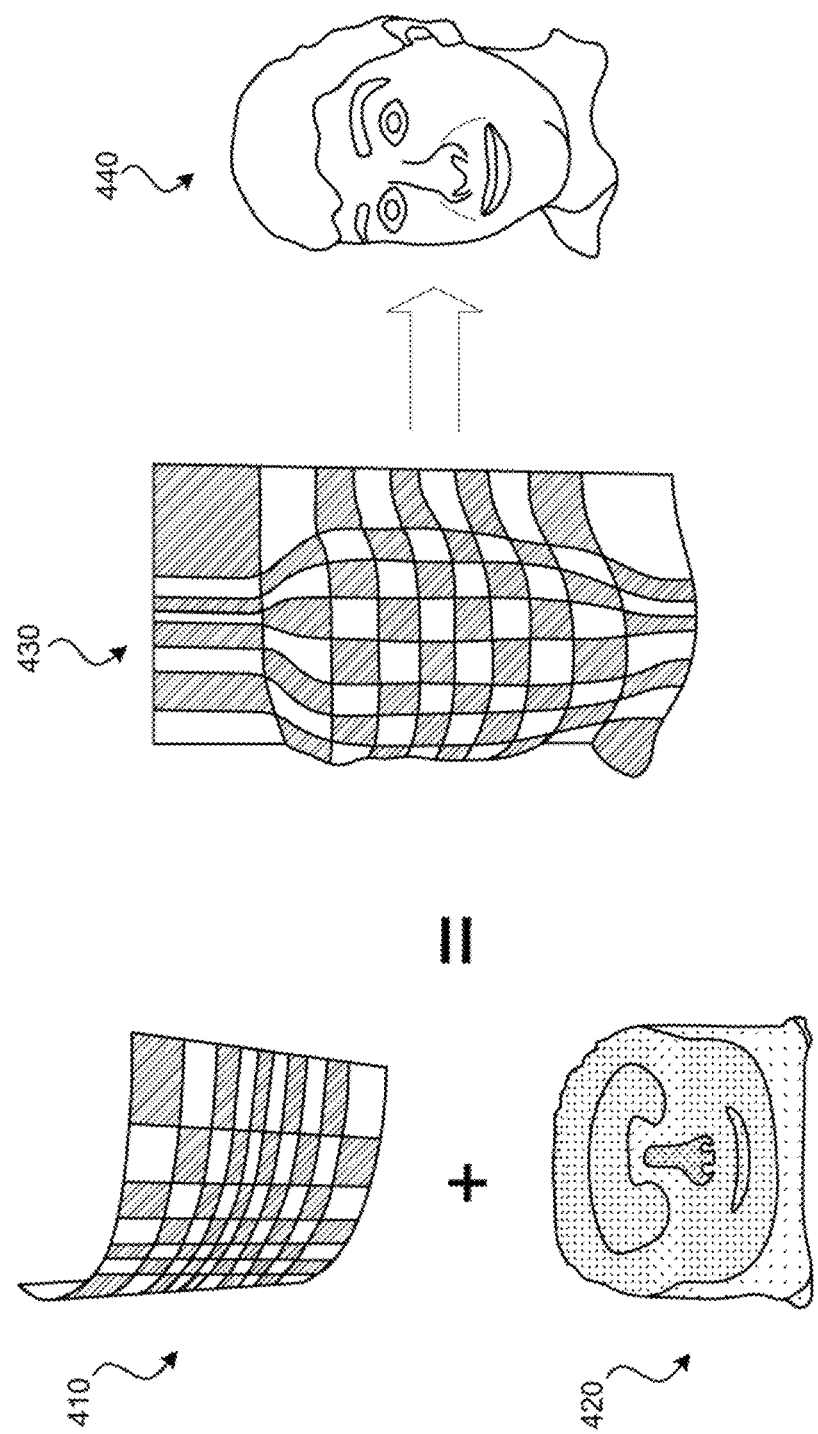

ALIGNING USER REPRESENTATIONS

CROSS-REFERENCE TO RELATED APPLICATIONS

This application claims the benefit of U.S. Provisional Application Ser. No. 63/409,459 filed Sep. 23, 2022, which is incorporated herein in its entirety.

TECHNICAL FIELD

The present disclosure generally relates to electronic devices, and in particular, to systems, methods, and devices for representing users in computer-generated content.

BACKGROUND

Existing techniques may not accurately or honestly present current (e.g., real-time) representations of the appearances of users of electronic devices. For example, a device may provide an avatar representation of a user based on images of the user's face that were obtained minutes, hours, days, or even years before. Such a representation may not accurately represent the user's current (e.g., real-time) appearance, for example, not showing the user's avatar as smiling when the user is smiling or not showing the user's current beard. Thus, it may be desirable to provide a means of efficiently providing more accurate, honest, and/or current representations of users.

SUMMARY

Various implementations disclosed herein include devices, systems, and methods that generate a set of values that represent a three-dimensional (3D) shape and appearance of a user's face at a point in time to be used to generate a user representation (e.g., an avatar). In some implementations, the set of values maybe defined relative to a surface that has a non-planar shape (e.g., a curviplanar shape). The set of values may include depth values that define depths of portions of the face relative to multiple points on such a surface, e.g., points in a grid on a partially-cylindrical surface. For example, a depth value of one point may define that a portion of the face is at depth D1 behind that point's position on the surface, e.g., at depth D1 along an orthogonal ray starting at that point. The techniques described herein use depth values that are different than the depth values in existing RGBDA images (e.g., red-green-blue-depth-alpha images), because existing RGBDA images define content depth relative to a single camera location, and the techniques described herein define depths relative to multiple points on a surface of a planar shape (e.g., a curviplanar shape).

Several advantages may be realized using the relatively simple set of values with depth values defined relative to multiple points on a surface. The set of values may require less computation and bandwidth than using a 3D mesh or 3D point cloud, while enabling a more accurate user representation than an RGBDA image. Moreover, the set of values may be formatted/packaged in a way that is similar to existing formats, e.g., RGBDA images, which may enable more efficient integration with systems that are based on such formats.

Various implementations disclosed herein include devices, systems, and methods that generate a 3D representation of a user for each of multiple instants in time by combining the same predetermined 3D data of a first portion of the user with frame-specific 3D data for a second portion of the user captured at multiple instants in time. The predetermined 3D data may be a mesh of the user's upper body and head generated from enrollment data (e.g., one-time pixel-aligned implicit function (PIFu) data). The predetermined 3D data, such as PI Fu data, may include a highly effective implicit representation that locally aligns pixels of 2D images with the global context of their corresponding 3D object. The frame-specific data may represent the user's face at each of multiple points in time, e.g., live sequence of frame-specific 3D representation data such as the set of values that represent a 3D shape and appearance of a user's face at a point in time as described herein. The 3D data from these two different sources (e.g., PIFu data and frame-specific 3D data) may be combined for each instant in time by spatially aligning the data using a 3D reference point (e.g., a point defined relative to a skeletal representation) with which both data sets are associated. The 3D representations of the user at the multiple instants in time may be generated on a viewing device that combines the data and uses the combined data to render views, for example, during a live communication (e.g., a co-presence) session.

Various implementations disclosed herein include devices, systems, and methods that adjust the colors of a first 3D representation of a first portion (e.g., head, hair, upper body, clothes, etc.) of a user determined via a first technique (e.g., PIFu). The colors are adjusted using a sample 3D representation of a second portion of the user determined via a second, different technique (e.g., face/hair in a sample captured previously, for example, during a prior enrollment process). This adjusting provides better color matching in combined 3D representations generated by combining the first 3D representations with one or more second 3D representations (e.g., frame-specific 3D representations) generated via the second technique (e.g., live sequence of frame-specific 3D representation data such as the set of values that represent a 3D shape and appearance of a user's face at a point in time as described herein). For example, the first representation may be PIFu-based and may be adjusted so that the neck color better matches the face color of the frame-specific 3D face representations. Colors may be adjusted using a transform (e.g., determined using a Monge-Kanorovich Color Transfer technique, or the like). Determining such a transform may be facilitated by reconstructing the first representation into the same space as the sample 3D representation (e.g., reconstruct the PIFu representation in a UV space). This enables a more accurate transform based on comparing colors of the corresponding user parts.

Various implementations disclosed herein include devices, systems, and methods that adjusts the colors of a first 3D representation of a first portion of a user (e.g., hands). The colors are adjusted using a sample 3D representation of a second portion of the user (e.g., face/hair). In some implementations, there is no overlap between the first 3D representation and the sample 3D representation of the second portion of the user (e.g., one representation shows the face and the other the hands). Color adjusting accuracy may be improved by filtering out non-skin data (e.g., hair, clothing, etc.). Colors may be adjusted using a transform (e.g., determined using the Monge-Kanorovich Color Transfer technique). In some implementations, shadowing in the sample representation may produce color adjustments that are too dark which may be accounted for by taking only a subset of the data (e.g., the brightest 25% of the data).

In general, one innovative aspect of the subject matter described in this specification can be embodied in methods that include the actions of, at a processor of a device, obtaining a predetermined three-dimensional (3D) representation of at least a first portion of a user, wherein the predetermined 3D representation is associated with a 3D reference point defined relative to a skeletal representation of the user, obtaining a sequence of frame-specific 3D representations corresponding to multiple instants in a period of time, each of the frame-specific 3D representations representing a second portion of the user at a respective instant of the multiple instants in the period of time and each of the frame-specific 3D representations associated with the 3D reference point, and generating combined 3D representations of the user for the multiple instants in the period of time, wherein each of the combined 3D representations is generated by combining the predetermined 3D representation with a respective frame-specific 3D representation based on an alignment, wherein the alignment is based on the 3D reference point.

These and other embodiments can each optionally include one or more of the following features.

In some aspects, the second portion of the user is a sub-portion of the first portion. In some aspects, the first portion of the user includes a face portion and an additional portion of the user, and the second portion of the user includes the face portion without the additional portion of the user. In some aspects, the 3D reference point is associated with a 3D position of an atlas joint of a skeletal representation of the user.

In some aspects, the 3D reference point is associated with the center of the eyes of the user defined at a position at an offset from the atlas joint.

In some aspects, combining the predetermined 3D representation with the respective frame-specific 3D representations includes adjusting a sub-portion of the predetermined 3D representation.

In some aspects, adjusting the sub-portion of the predetermined 3D representation includes adjusting positions of vertices of the predetermined 3D representation and applying texture based on each of the frame-specific 3D representations.

In some aspects, each of the frame-specific 3D representations is defined using height values specified within a heightfield that is positionally associated with the 3D reference point.

In some aspects, vertices of the predetermined 3D representation are mapped to positions on the heightfield and associated with height values, wherein the vertices are mapped based on the 3D reference point.

In some aspects, combining the predetermined 3D representation with each of the frame-specific 3D representations includes adjusting at least some of the height values associated with the vertices based on the height values specified for the respective frame-specific 3D representation.

In some aspects, adjusting the vertices includes blending, using specified alpha values, at least some of the height values associated with the vertices with the height values specified for the respective the frame-specific 3D representation. In some aspects, adjusting the vertices includes blending, using the specified alpha values, at least some texture values associated with the vertices with texture values specified for the respective frame-specific representation. In some aspects, the first portion represented by the predetermined 3D representation represents an upper body and a head of the user.

In some aspects, the predetermined 3D representation is generated using a pixel-aligned implicit function (PIFu) technique that locally aligns pixels of 2D enrollment images with a global context to form the predetermined 3D representation.

In some aspects, each of the frame-specific 3D representations is generated based on sensor data from an inward or down-facing camera and enrollment data, wherein the enrollment data includes images of the second portion of the user exhibiting a plurality of different facial expressions.

In some aspects, each of the frame-specific 3D representations includes a configuration of a skeletal representation of the user at a respective instant of the multiple instants in the period of time, wherein the 3D reference point is defined based on a node of the skeletal representation.

In some aspects, the actions further include rendering a view of the combined 3D representations. In some aspects, the rendering occurs during a communication session in which a second device captures sensor data and provides the sequence of frame-specific 3D representations corresponding to the multiple instants in the period time based on the sensor data.

In some aspects, the second device provides the predetermined 3D representation of the user during the communication session. In some aspects, the second device generates the combined 3D representation of the user and provides the combined 3D representation to the device during the communication session.

In some aspects, views of the combined 3D representations are displayed on the device in real-time relative to the multiple instants in the period of time. In some aspects, the device is a head-mounted device (HMD).

These and other embodiments can each optionally include one or more of the following features.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 4 illustrates an example of updating portions of a representation of a face of a user in accordance with some implementations.

Figure 1:
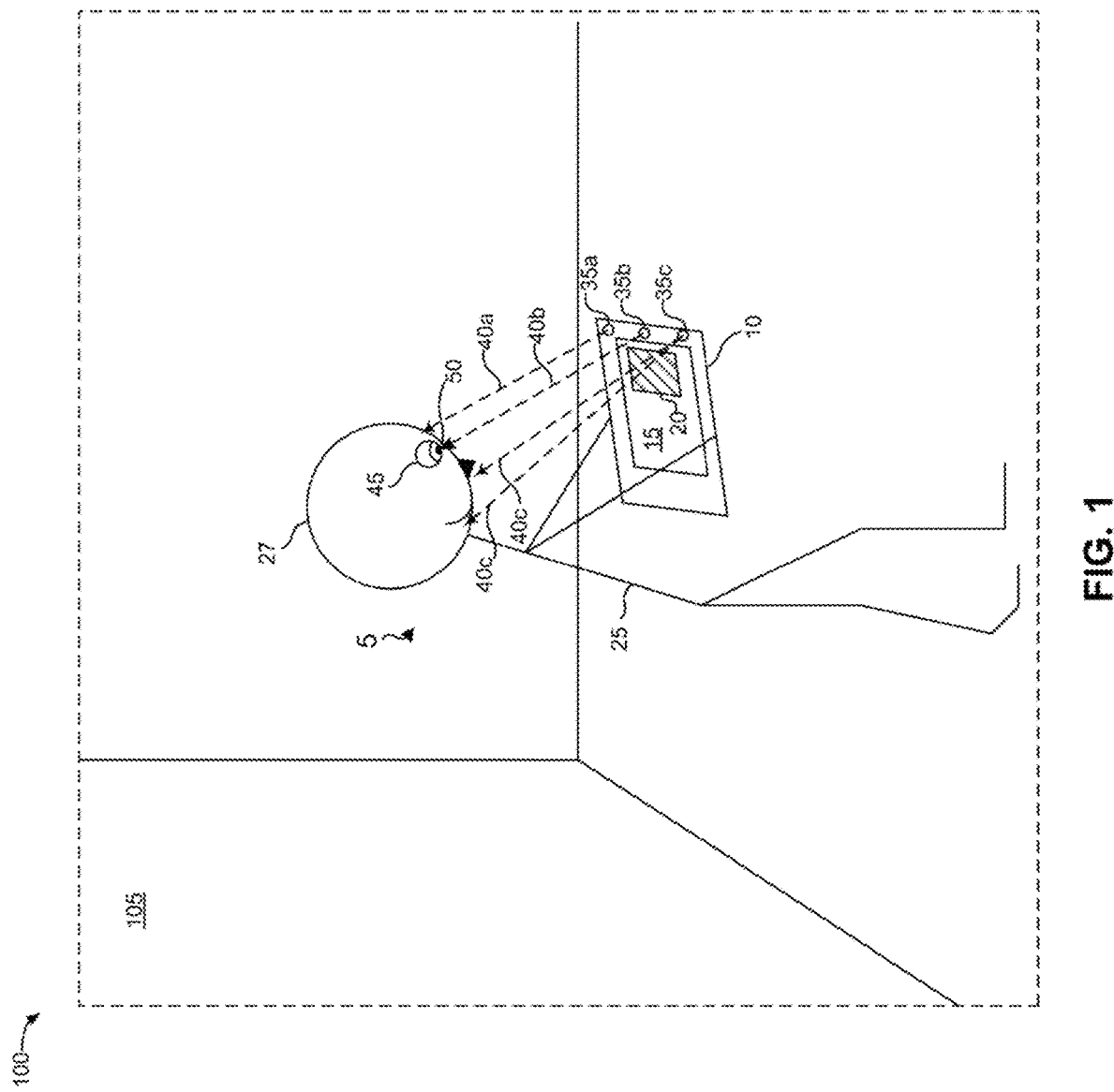
FIG. 1 illustrates a device obtaining sensor data from a user according to some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates an example environment 100 of a real-world environment 105 (e.g., a room) including a device 10 with a display 15. In some implementations, the device 10 displays content 20 to a user 25. For example, content 20 may be a button, a user interface icon, a text box, a graphic, an avatar of the user or another user, etc. In some implementations, the content 20 can occupy the entire display area of display 15.

The device 10 obtains image data, motion data, and/or physiological data (e.g., pupillary data, facial feature data, etc.) from the user 25 via a plurality of sensors (e.g., sensors 35a, 35b, and 35c). For example, the device 10 obtains eye gaze characteristic data 40b via sensor 35b, upper facial feature characteristic data 40a via sensor 35a, and lower facial feature characteristic data 40c via sensor 35c.

While this example and other examples discussed herein illustrate a single device 10 in a real-world environment 105, the techniques disclosed herein are applicable to multiple devices as well as to other real-world environments. For example, the functions of device 10 may be performed by multiple devices, with the sensors 35a, 35b, and 35c on each respective device, or divided among them in any combination.

In some implementations, the plurality of sensors (e.g., sensors 35a, 35b, and may include any number of sensors that acquire data relevant to the appearance of the user 25. For example, when wearing a head-mounted device (HMD), one sensor (e.g., a camera inside the HMD) may acquire the pupillary data for eye tracking, and one sensor on a separate device (e.g., one camera, such as a wide range view) may be able to capture all of the facial feature data of the user. Alternatively, if the device 10 is an HMD, a separate device may not be necessary. For example, if the device 10 is an HMD, in one implementation, sensor 35b may be located inside the HMD to capture the pupillary data (e.g., eye gaze characteristic data 40b), and additional sensors (e.g., sensor 35a and 35c) may be located on the HMD but on the outside surface of the HMD facing towards the user's head/face to capture the facial feature data (e.g., upper facial feature characteristic data 40a via sensor 35a, and lower facial feature characteristic data 40c via sensor 35c). For example, the user 25 may hold an HMD in front of his or her face, face the HMD at the user, and external cameras on the HMD may capture images of the user's face for enrollment.

In some implementations, as illustrated in FIG. 1, the device 10 is a handheld electronic device (e.g., a smartphone or a tablet). In some implementations the device 10 is a laptop computer or a desktop computer. In some implementations, the device 10 has a touchpad and, in some implementations, the device 10 has a touch-sensitive display (also known as a "touch screen" or "touch screen display"). In some implementations, the device 10 is a wearable device such as an HMD.

In some implementations, the device 10 includes an eye tracking system for detecting eye position and eye movements via eye gaze characteristic data 40b. For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user 25. Moreover, the illumination source of the device 10 may emit NIR light to illuminate the eyes of the user 25 and the NIR camera may capture images of the eyes of the user In some implementations, images captured by the eye tracking system may be analyzed to detect position and movements of the eyes of the user 25, or to detect other information about the eyes such as color, shape, state (e.g., wide open, squinting, etc.), pupil dilation, or pupil diameter. Moreover, the point of gaze estimated from the eye tracking images may enable gaze-based interaction with content shown on the near-eye display of the device 10.

In some implementations, the device 10 has a graphical user interface (GUI), one or more processors, memory and one or more modules, programs or sets of instructions stored in the memory for performing multiple functions. In some implementations, the user 25 interacts with the GUI through finger contacts and gestures on the touch-sensitive surface. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program products configured for execution by one or more processors.

In some implementations, the device 10 employs various physiological sensors, detection, or measurement systems. Detected physiological data may include, but is not limited to, electroencephalography (EEG), electrocardiography (ECG), electromyography (EMG), functional near infrared spectroscopy signal (fNIRS), blood pressure, skin conductance, or pupillary response. Moreover, the device 10 may simultaneously detect multiple forms of physiological data in order to benefit from synchronous acquisition of physiological data. Moreover, in some implementations, the physiological data represents involuntary data, e.g., responses that are not under conscious control. For example, a pupillary response may represent an involuntary movement.

In some implementations, one or both eyes 45 of the user 25, including one or both pupils 50 of the user 25 present physiological data in the form of a pupillary response (e.g., eye gaze characteristic data 40b). The pupillary response of the user 25 results in a varying of the size or diameter of the pupil 50, via the optic and oculomotor cranial nerve. For example, the pupillary response may include a constriction response (miosis), e.g., a narrowing of the pupil, or a dilation response (mydriasis), e.g., a widening of the pupil. In some implementations, the device 10 may detect patterns of physiological data representing a time-varying pupil diameter.

The user data (e.g., upper facial feature characteristic data 40a, lower facial feature characteristic data 40c, and eye gaze characteristic data 40b) may vary in time and the device 10 may use the user data to generate and/or provide a representation of the user.

In some implementations, the user data (e.g., upper facial feature characteristic data 40a and lower facial feature characteristic data 40c) includes texture data of the facial features such as eyebrow movement, chin movement, nose movement, cheek movement, etc. For example, when a person (e.g., user 25) smiles, the upper and lower facial features (e.g., upper facial feature characteristic data 40a and lower facial feature characteristic data 40c) can include a plethora of muscle movements that may be replicated by a representation of the user (e.g., an avatar) based on the captured data from sensors 35.

According to some implementations, the electronic devices (e.g., device 10) can generate and present an extended reality (XR) environment to one or more users during a communication session. In contrast to a physical environment that people can sense and/or interact with without aid of electronic devices, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2:
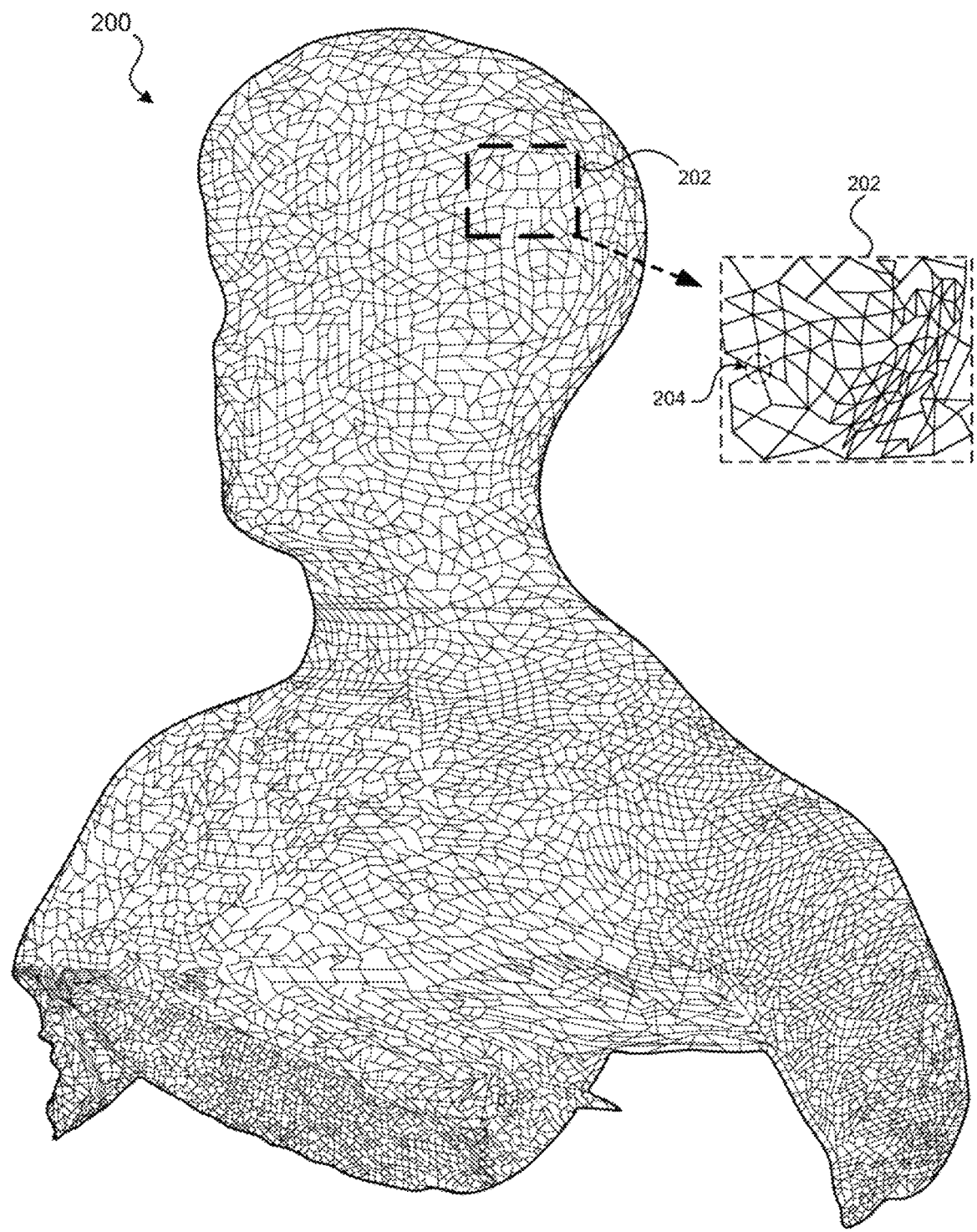
FIG. 2 illustrates an example of a three-dimensional (3D) representation of at least a portion of a user according to some implementations.

FIG. 2 illustrates an example of a 3D representation 200 of at least a portion of a user according to some implementations. For example, the 3D representation 200 may represent a portion of the user 25 after being scanned by one or more sensors of device 10 (e.g., during an enrollment process). In an exemplary implementation, the 3D representation 200 may be generated using a pixel-aligned implicit function (PIFu) technique that locally aligns pixels of 2D enrollment images with a global context to form the 3D representation 200 (also referred to as a PI Fu mesh). The 3D representation 200 includes a plurality of vertices and polygons that may be determined at an enrollment process based on image data, such as RGB data and depth data. For example, as illustrated in the expanded area 202, vertex 204 is circled as a point between two or more polygons that are a part of the 3D PI Fu mesh.

Figure 3A:
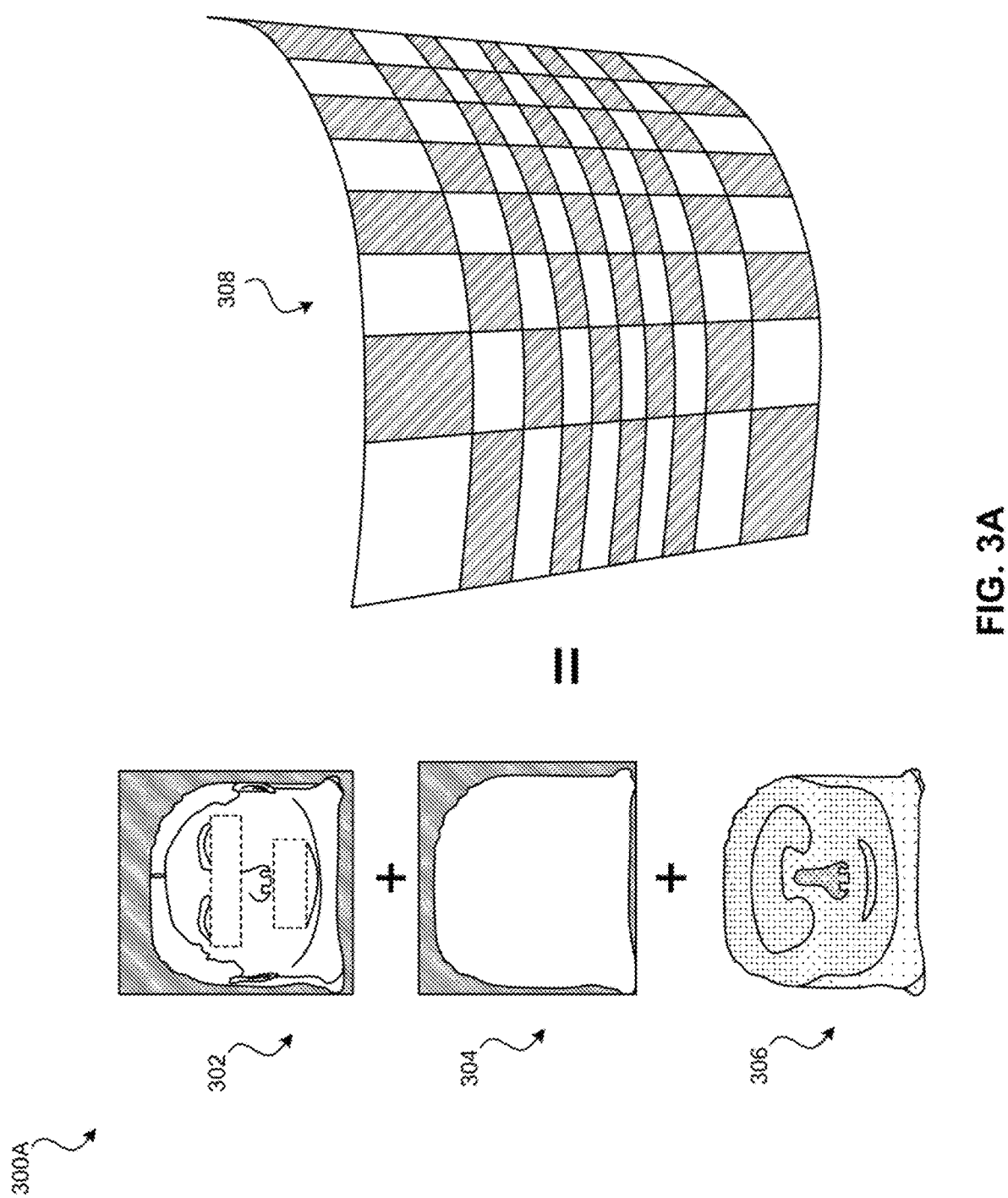
FIGS. 3A and 3B illustrate examples of a surface of a two-dimensional (2D) manifold provided as a visualization of a heightfield representation of a face in accordance with some implementations.
Figure 3B:
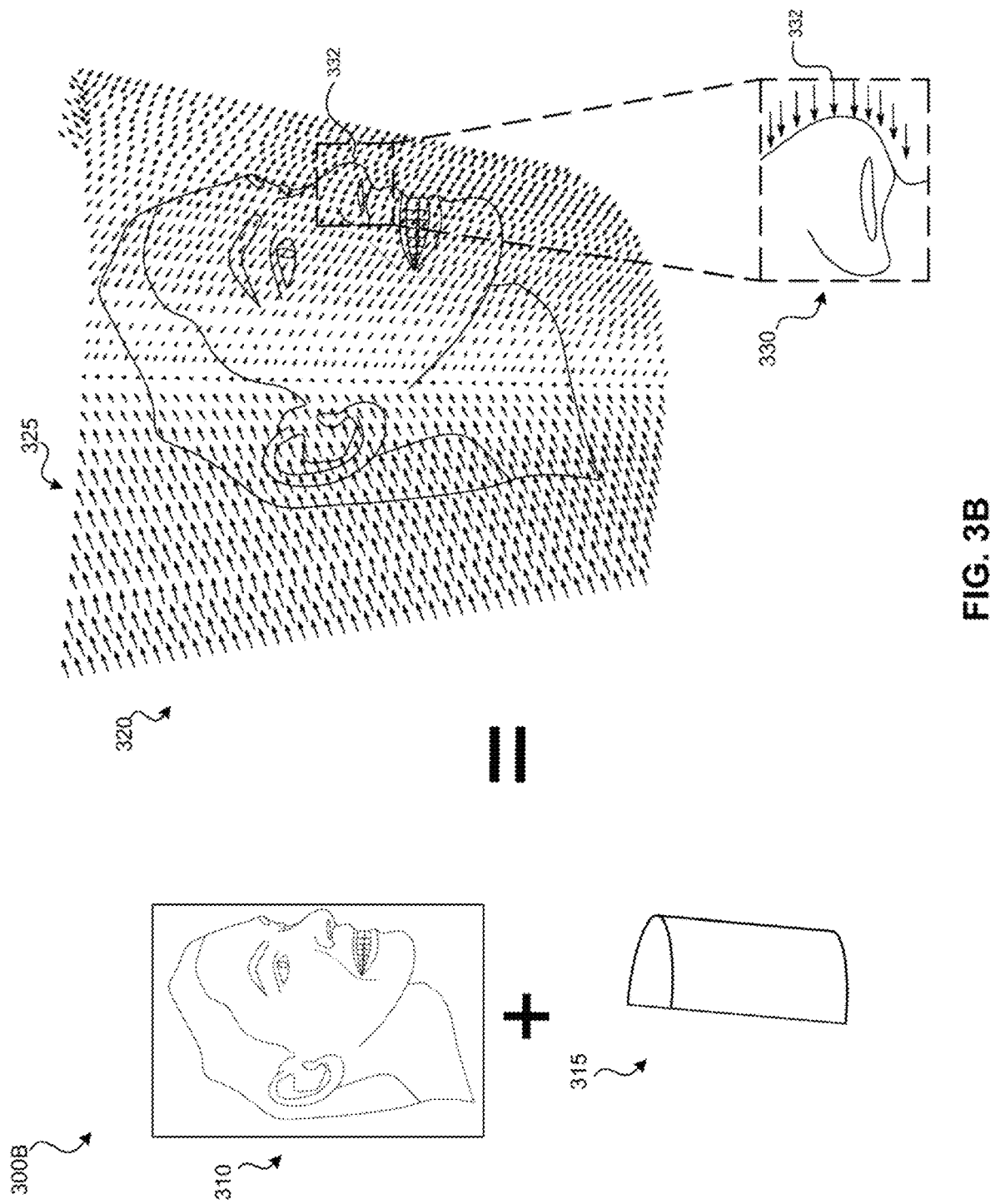

FIG. 3A and FIG. 3B illustrate examples of a surface of a two-dimensional (2D) manifold provided as a visualization of a heightfield representation of a face in accordance with some implementations. A "heightfield representation" may also be referred to herein as a parameterization grid. In particular, FIG. 3A illustrates an example environment 300A of a heightfield representation of a face that combines three different types of data to provide a heightfield representation of the face as illustrated by a face representation grid 308. The different types of data include the RGB data 302, the alpha data 304, and the depth data 306. For each frame of obtained image data, techniques described herein determine the RGB data 302, the alpha data 304, and the depth data 306, and provide this unconventional "RGBDA" data as illustrated by a face representation grid 308. For example, the face representation grid 308 provides a mapping to a location on the 2D manifold based on ray origins and ray directions. The face representation grid 308, or ray grid, provides the depth data to generate and/or update a 3D reconstruction of the face (e.g., as a user if moving his or her face, such as while talking in a communication session). The application of applying the face representation grid 308 is further described with FIGS. 3B and 4.

FIG. 3B illustrates an example environment 300B of a surface of a two-dimensional manifold provided as a visualization of a representation of a face of a user in accordance with some implementations. In particular, environment 300B illustrates a parameterization image 320 of a representation of a face of a user (e.g., user 25 of FIG. 1). The parameterization image 320 illustrates a more detailed illustration of the face representation grid 308 of FIG. 3A. For example, a frame-specific representation instruction set can obtain live image data of a face of a user (e.g., image 310) and parameterize different points upon the face based on a surface of a shape, such as the curviplanar shape 315. In other words, the frame-specific representation instruction set can generate a set of values that represent a 3D shape and appearance of a user's face at a point in time to be used to generate a user representation (e.g., an avatar). In some implementations, using a surface that has a non-planar shape (e.g., a curviplanar shape 315) provides less distortion than using a flat/planar surface or using a single point. The set of values includes depth values that define depths of portions of the face relative to multiple points on a surface, e.g., points in a grid on a partially-cylindrical surface, such as the array of points 325 (e.g., vector arrows pointing towards the face of the representation of the user to represent a depth value, similar to a heightfield or heightmap, or a parameterization grid). The parameterization values may include fixed parameters such as ray locations, endpoints, directions, etc., and the parameterization values may include changing parameters such as depth, color, texture, opacity, etc. that are updated with the live image data. For example, as illustrated in the expanded area 330 of the user's nose, a depth value of one point (e.g., point 332 at the tip of the user's nose) may define that a portion of the face is at depth D1 behind that point's position on the surface, e.g., at depth D1 along an orthogonal ray starting at, and orthogonal to, that point.

The techniques described herein use depth values that are different than the depth values in existing RGBDA images (e.g., red-green-blue-depth-alpha images), because existing RGBDA images define content depth relative to a single camera location/point, and the techniques described herein define depths as portions of a face relative to multiple points on a surface of a planar shape (e.g., a curviplanar shape). A curved surface, such as the curviplanar shape 315 implemented for the parameterization image 320, is used to reduce distortion of the user representation (e.g., avatar) at regions of the user's representation that are not visible from a flat projection surface. In some implementations, the projection surface of the planar shape can be bent and shaped in any way to mitigate distortion in desired areas based on the application of the parameterization. The use of different bent/curved shapes allows the user representation to be rendered clearly from more points of view.

FIG. 3B illustrates the points of the surface (e.g., the surface of the 2D manifold) as spaced at regular intervals along vertical and horizontal lines on the surface (e.g., evenly spaced vector arrows pointing towards the face of the representation of the user). In some implementations, the points may be unevenly distributed across the surface of the 2D manifold, such as not regularly spaced along vertical and horizontal grid lines about a surface, but may be focused on particular area(s) of the user's face. For example, some areas can have more points where there might be more detail/movement in the face's structure, and some points can have fewer points in areas where there might be less detail/movement, like forehead (less detail) and nose (doesn't move much). In some implementations, when generating a representation of a user during a communication session (e.g., generating an avatar), techniques described herein may selectively focus more on the areas of the eyes and mouth that would likely move more during a conversation, thus producing a more accurate representation of a person during a communication session. For example, techniques described herein may render updates to a user's representation around the mouth and eyes at a faster frame rate than the other portions of the face that do not move as much during a conversation (e.g., forehead, ears, etc.).

FIG. 4 illustrates an example environment 400 of updating portions of a representation of a face of a user in accordance with some implementations. In particular, FIG. 4 illustrates the application of utilizing the face representation grid 410 (e.g., face representation grid 308) and updated depth data 420, and mapping the updated face representation grid 410 to a face of a user as shown in the mapping image 430. The updated mapping image 430 can then be utilized to update the representation 440 of a user in real-time (e.g., as additional frames of RGBDA data is obtained). In an exemplary implementation, the mapping data is based on a 3D reference point defined relative to skeletal representation such as based on a defined atlas joint of the user, as further described herein with reference to FIGS. 5A, 5B, and 6.

Figure 5B:
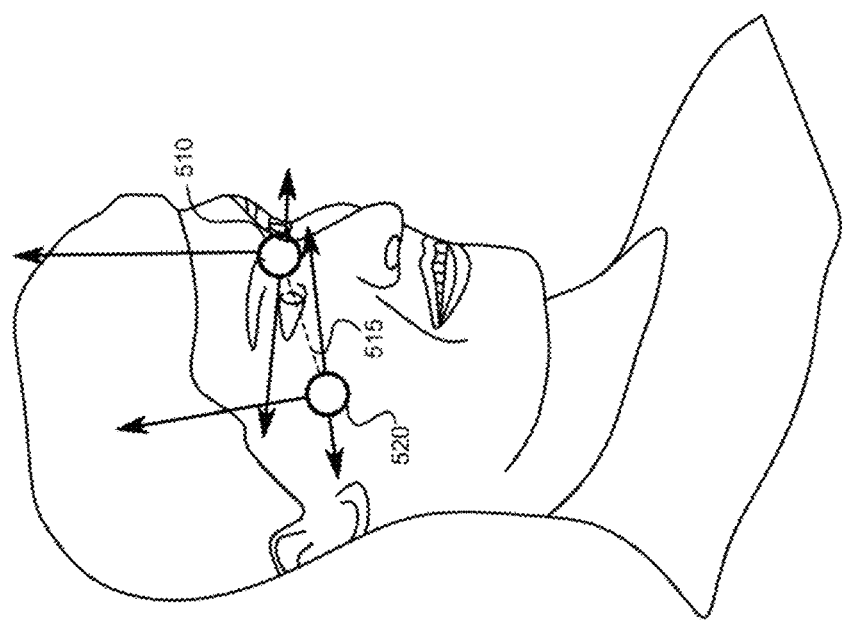
FIGS. 5A and 5B illustrate examples of a 3D reference point defined relative to a skeletal representation of the user in accordance with some implementations.
Figure 5A:
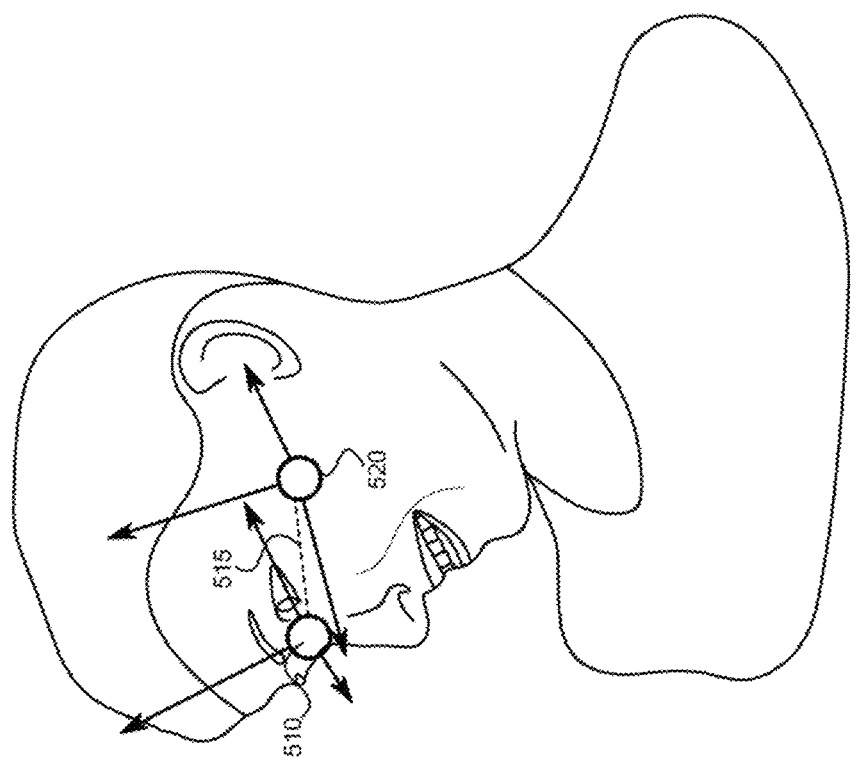

FIGS. 5A and 5B illustrate examples of a 3D reference point defined relative to a skeletal representation of the user in accordance with some implementations. FIGS. 5A and 5B illustrate a user (e.g., user 25 in FIG. 1) at different head positions and orientations to illustrate different skeletal positions. In particular, FIGS. 5A and 5B each illustrate a 3D reference point 510 that is determined based on an offset 515 from a determined atlas joint 520. The 3D reference point 510 may be utilized to track kinematic motion of a user by tracking skeletal motion with respect to the atlas joint (e.g., provided tracking in the X-axis aligned to the ear canals and the z-axis relative to a Frankfurt plane). In some implementations, the 3D reference point 510 is associated with the center of the eyes of the user defined at a position at an offset from the atlas joint. For example, during an enrollment process, an offset may be determined which provides mid-pupil origin for a parameterization grid (e.g., a heightfield representation). In some implementations, the 3D reference point may be a point centered between the user's eyes based on the skeleton's atlas joint and user-specific head-shape characteristics (e.g., offset location of the 3D reference point 510 associated with a determined location of the atlas joint 520 based on the offset 515). An example of utilizing the 3D reference point 510 to combine a predetermined 3D representation and a parameterization grid to generate a representation of a portion of a user is further described herein with reference to FIG. 6.

Figure 6:
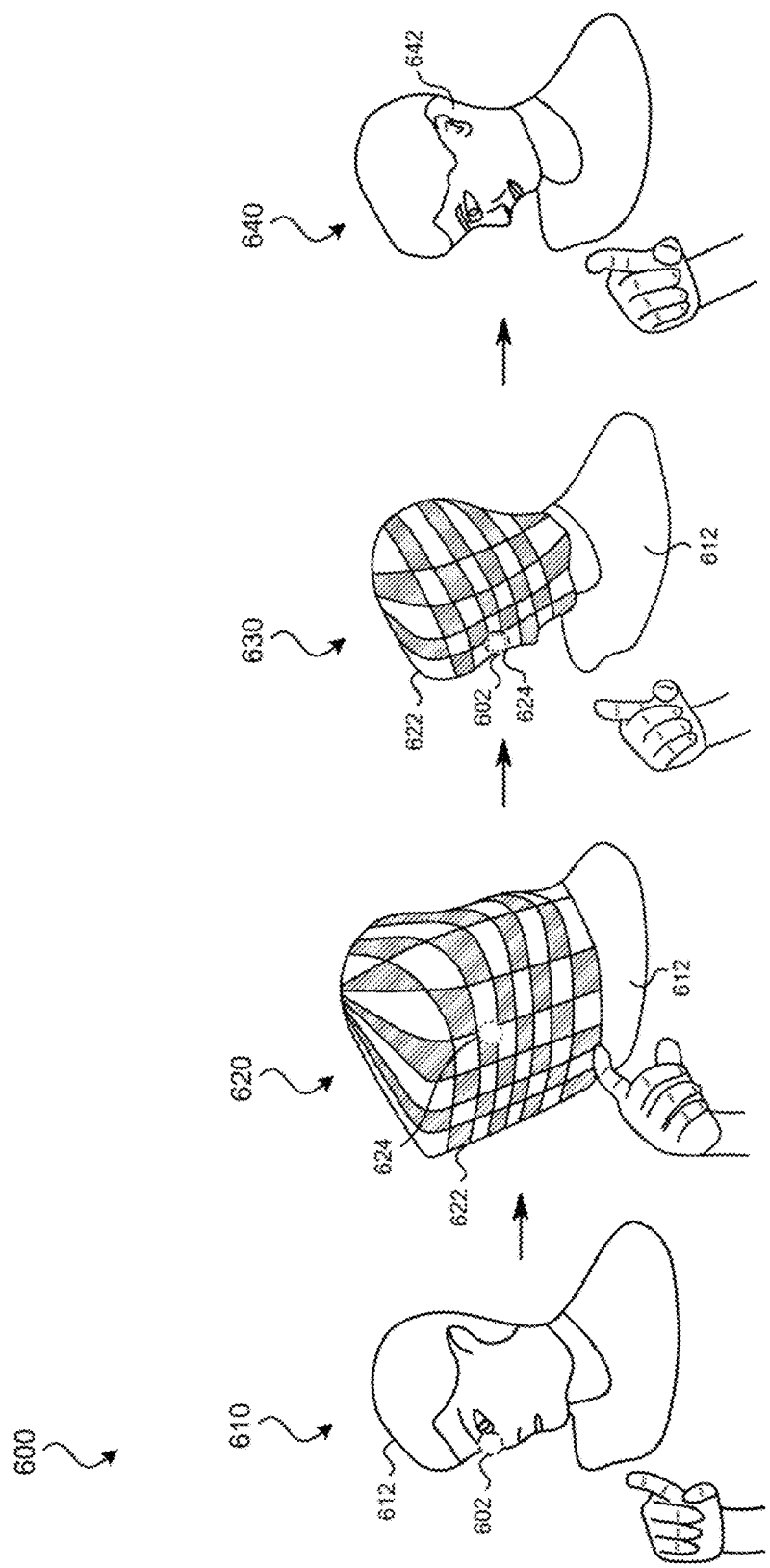
FIG. 6 illustrates an example in which a predetermined 3D representation and a parameterization grid are combined to generate a representation of a portion of a user based on a 3D reference point in accordance with some implementations.

FIG. 6 illustrates an example environment 600 in which a predetermined 3D representation and a parameterization grid are combined to generate a representation of a portion of a user based on a 3D reference point in accordance with some implementations. In an exemplary implementation, at step 610, a predetermined 3D representation 612 (e.g., 3D representation 200) is obtained (e.g., from an enrollment process) that includes a location for a 3D reference point 602 (e.g., 3D reference point 510 that is associated with the center of the eyes of the user defined at a position at an offset from the atlas joint to track skeletal motion). Then at step 620, a frame of a parameterization grid 622 is obtained and a depth matching process associated with the the predetermined 3D representation 612 has initiated. For example, facial points of the parameterization grid 622 (e.g., a PI Fu mesh) are projected outward to find the corresponding points on predetermined 3D representation 612 (e.g., the curved projection plane). The parameterization grid 622 also includes a location for a 3D reference point 624 (e.g., 3D reference point 510 that is associated with the center of the eyes of the user defined at a position at an offset from the atlas joint to track skeletal motion) that is utilized to initialize a mapping between the predetermined 3D representation 612 and the parameterization grid 622. Then at step 630, the frame of the parameterization grid 622 is combined over the predetermined 3D representation 612 based on the 3D reference points 602, 624. At step 640, based on the mapped combination the predetermined 3D representation 612 and the frame of the parameterization grid 622, an updated representation 642 of a user is determined. In some implementations, in which the frame-specific 3D representations are defined using the parameterization grid 622 (e.g., a heightfield), the combining of the data may be facilitated by mapping the vertices of the predetermined 3D representation to positions on the parameterization grid 622 based on the 3D reference point (e.g., 3D reference points 602, 624). The mapping using the 3D reference point enables the frame-specific face data specified on the parameterization grid 622 to be directly used to adjust the positions of the vertices of the predetermined 3D representation 612. In some implementations, the positions of the vertices may be adjusted (e.g., using specified alpha values) by blending their predetermined vertex positions with their frame-specific data vertex positions. In other words, the predetermined 3D representation vertices may be mapped onto the parameterization grid 622, the parameterization grid 622 is adjusted using real-time data corresponding to the head/face of the user, and the adjusted parameterization grid 622 represents a combined 3D representation of the user combining the predetermined 3D representation with one of the frame-specific 3D representations.

In some implementations, combining the predetermined 3D representation 612 with the respective frame-specific 3D representation of the parameterization grid 622 includes adjusting a sub-portion (e.g., a face portion) of the predetermined 3D representation 612. In some implementations, adjusting the sub-portion of the predetermined 3D representation 612 includes adjusting positions of vertices of the predetermined 3D representation 612 (e.g., a PI Fu mesh, such as 3D representation 200 of FIG. 2) and applying texture based on each of the frame-specific 3D representations (e.g., parameterization grid 622). For example, the adjusting may deform and color the predetermined sub-portion (e.g., face) to correspond with the real-time shape and color of that portion (e.g., face) of the user at each of the instants in time.

Figure 7:
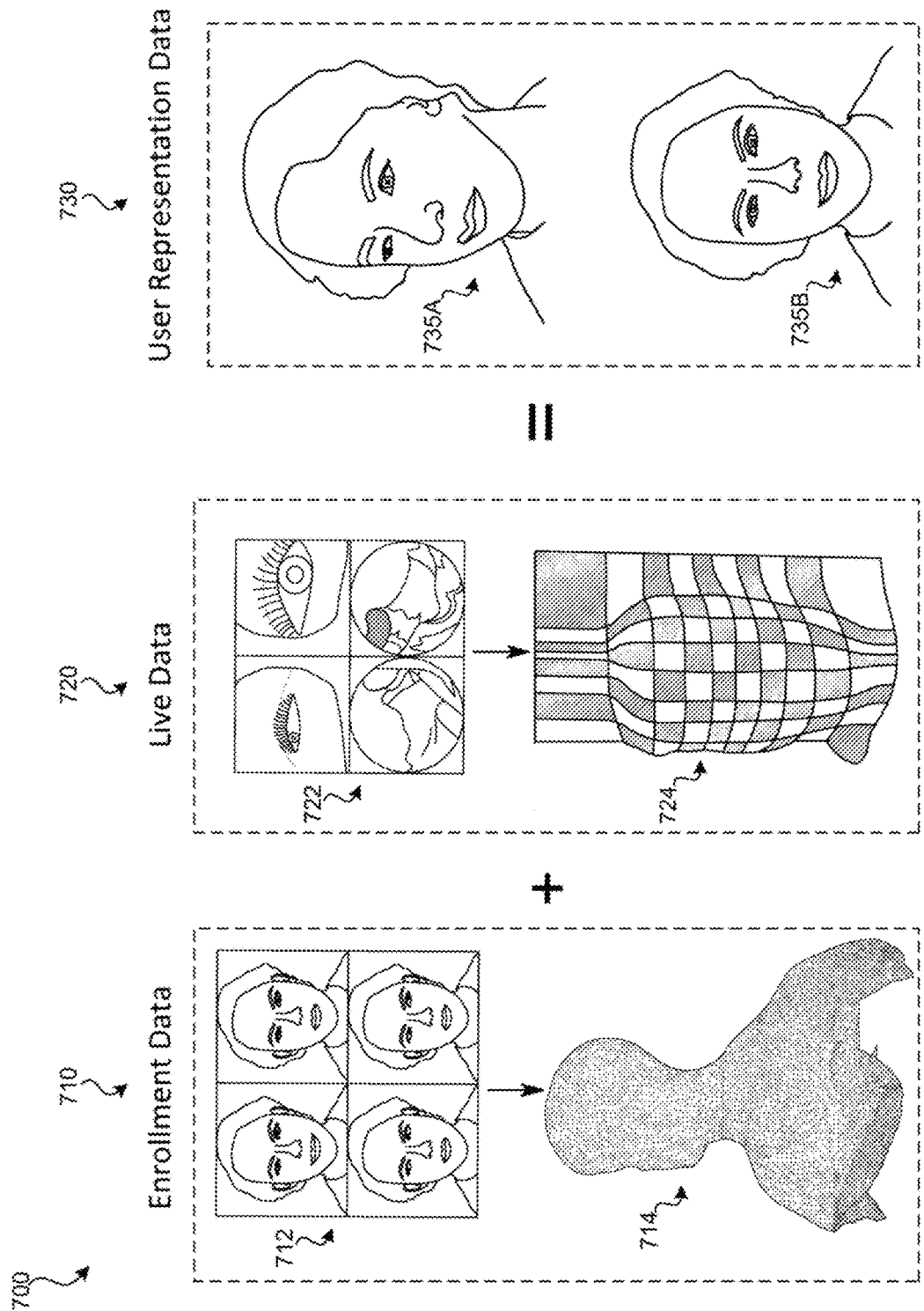
FIG. 7 illustrates an example of generating and displaying portions of a representation of a face of a user in accordance with some implementations.

FIG. 7 illustrates an example of generating and displaying portions of a representation of a face of a user in accordance with some implementations. In particular, FIG. 7 illustrates an example environment 700 of a process for combining enrollment data 710 (e.g., enrollment image data 712 and a generated predetermined 3D representation 714) and live data 720 (e.g., live image data 722 and generated frame-specific 3D representations 724) to generate user representation data 730 (e.g., an avatar 735). Enrollment image data 712 illustrates images of a user (e.g., user 25 of FIG. 1) during an enrollment process. For example, the enrollment personification may be generated as the system obtains image data (e.g., RGB images) of the user's face while the user is providing different facial expressions. For example, the user may be told to "raise your eyebrows," "smile," "frown," etc., in order to provide the system with a range of facial features for an enrollment process. An enrollment personification preview may be shown to the user while the user is providing the enrollment images to get a visualization of the status of the enrollment process. In this example, enrollment image data 710 displays the enrollment personification with four different user expressions, however, more or less different expressions may be utilized to acquire sufficient data for the enrollment process. The predetermined 3D representation 714 (e.g., 3D representation 200) includes a plurality of vertices and polygons that may be determined at an enrollment process based on image data, such as RGB data and depth data.

The live image data 722 represents examples of acquired images of the user while using the device such as during an XR experience (e.g., live image data while using the device 10 of FIG. 1, such as an HMD). For example, the live image data 722 represents the images acquired while a user is wearing the device 10 of FIG. 1 as an HMD. For example, if the device 10 is an HMD, in one implementation, sensor 35*b* may be located inside the HMD to capture the pupillary data (e.g., eye gaze characteristic data 40*b*), and additional sensors (e.g., sensor 35*a* and 35*c*) may be located on the HMD but on the outside surface of the HMD facing towards the user's head/face to capture the facial feature data (e.g., upper facial feature characteristic data 40*a* via sensor 35*a*, and lower facial feature characteristic data 40*c* via sensor 35*c*). The generated frame-specific 3D representations 724 may be generated based on the obtained live image data 722.

User representation data 730 is an example illustration of a user during an avatar display process. For example, the avatar 735A (side facing) and avatar 735B forward facing are generated based on acquired enrollment data 710 and updated as the system obtains and analyzes the real-time image data of the live data 720 and updates different values for the planar surface (e.g., the values for the vector points of the array for the frame-specific 3D representation 724 are updated for each acquired live image data).

Figure 8:
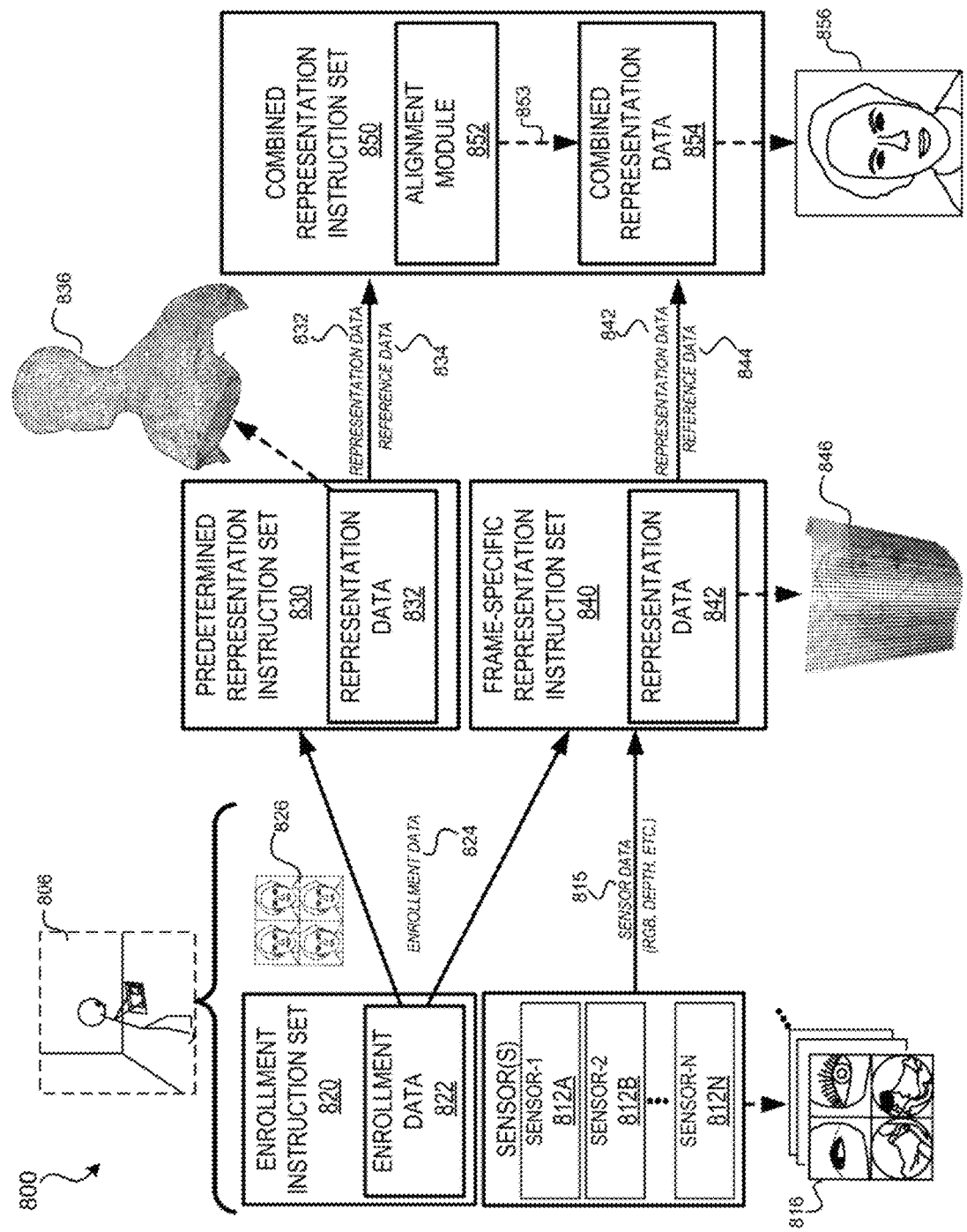
FIG. 8 illustrates a system flow diagram that can generate a combined representation of a user based on predetermined representation data and frame-specific representation data in accordance with some implementations.

FIG. 8 is a system flow diagram of an example environment 800 in which a system can generate a combined representation of a user based on predetermined representation data and frame-specific representation data according to some implementations. In some implementations, the system flow of the example environment 800 may be performed between two or more devices (e.g., device 10 of FIG. 1), such as a mobile device, desktop, laptop, or server device. The images of the example environment 800 can be displayed on a device (e.g., device 10 of FIG. 1) that has a screen for displaying images and/or a screen for viewing stereoscopic images such as a head-mounted device (HMD). In some implementations, the system flow of the example environment 800 is performed on processing logic, including hardware, firmware, software, or a combination thereof. In some implementations, the system flow of the example environment 800 is performed on a processor executing code stored in a non-transitory computer-readable medium (e.g., a memory).

In some implementations, the system flow of the example environment 800 includes an enrollment process, a predetermined representation process, a frame-specific representation process, and an avatar display process based on combining representations. Alternatively, the example environment 800 may only include a predetermined representation process, a frame-specific representation process, and an avatar display process, and obtain the enrollment data from another source (e.g., previously stored enrollment data). In other words, the enrollment process may have already taken place such that the user's enrollment data is already provided because an enrollment process has already been completed. In an exemplary implementation, the system flow of the example environment 800 for the avatar display process is performed at a receiving device for display of an avatar and obtains the data from a sending device, where the sending device includes the enrollment process, the predetermined representation process, and the frame-specific representation process.

The system flow of the enrollment process of the example environment 800 acquires image data (e.g., RGB data) from sensors of a physical environment (e.g., the physical environment 105 of FIG. 1), and generates enrollment data. The enrollment data may include textures, muscle activations, etc., for the most, if not all, of the user's face. In some implementations, the enrollment data may be captured while the user is provided different instructions to acquire different poses of the user's face. For example, the user may be told to "raise your eyebrows," "smile," "frown," etc., in order to provide the system with a range of facial features for an enrollment process.

The system flow of the avatar display process of the example environment 800 acquires image data (e.g., RGB, depth, IR, etc.) from sensors of a physical environment (e.g., the physical environment 105 of FIG. 1), determines parameterization data of facial features, obtains and assesses the enrollment data, and generates and displays portions of a representation of a face (e.g., a 3D avatar) of a user based on parameterization values. For example, generating and displaying portions of a representation of a face of a user's technique described herein can be implemented on real-time sensor data that are streamed to the end user (e.g., a 3D avatar overlaid onto images of a physical environment within a CGR environment). In an exemplary implementation, the avatar display process occurs during real-time display (e.g., an avatar is updated in real-time as the user is making facial gestures and changes to his or her facial features). Alternatively, the avatar display process may occur while analyzing streaming image data (e.g., generating a 3D avatar for person from a video).

In an example implementation, the environment 800 includes an image composition pipeline that acquires or obtains data (e.g., image data from image source(s) such as sensors 812A-812N) of the physical environment. Example environment 800 is an example of acquiring image sensor data (e.g., light intensity data—RGB) for the enrollment process to generate enrollment data 824 (e.g., image data of different head poses and/or different facial expressions), utilizing the enrollment data 824 for the predetermined representation process, and acquiring image sensor data 815 (e.g., light intensity data, depth data, and position information) for the frame-specific representation process for a plurality of image frames. For example, illustration 806 (e.g., example environment 100 of FIG. 1) represents a user (e.g., user 25) acquiring image data as the user scans his or her face and facial features in a physical environment (e.g., the physical environment 105 of FIG. 1) during an enrollment process. Image(s) 816 represent a user acquiring image data as the user scans his or her face and facial features in real-time (e.g., during a communication session). The image sensor(s) 812A, 812B, through 812N (hereinafter referred to sensor(s) 812) may include one or more depth cameras that acquires depth data, one or more light intensity cameras (e.g., RGB camera) that acquires light intensity image data (e.g., a sequence of RGB image frames), and one or more position sensors to acquire positioning information.

For the positioning information, some implementations include a visual inertial odometry (VIO) system to determine equivalent odometry information using sequential camera images (e.g., light intensity data) to estimate the distance traveled. Alternatively, some implementations of the present disclosure may include a SLAM system (e.g., position sensors). The SLAM system may include a multidimensional (e.g., 3D) laser scanning and range measuring system that is GPS-independent and that provides real-time simultaneous location and mapping. The SLAM system may generate and manage data for a very accurate point cloud that results from reflections of a laser scanning from objects in an environment. Movements of any of the points in the point cloud are accurately tracked over time, so that the SLAM system can maintain precise understanding of its location and orientation as it travels through an environment, using the points in the point cloud as reference points for the location. The SLAM system may further be a visual SLAM system that relies on light intensity image data to estimate the position and orientation of the camera and/or the device.

In an example implementation, the environment 800 includes an enrollment instruction set 820 that is configured with instructions executable by a processor to generate enrollment data from sensor data. For example, the enrollment instruction set 820 acquires image data of the illustration 806 from sensors such as light intensity image data (e.g., RGB images from light intensity camera), and generates enrollment data 822 (e.g., facial feature data such as textures, muscle activations, etc.) of the user. For example, the enrollment instruction set generates the enrollment image data 824 (e.g., enrollment image data 710 of FIG. 7).

In an example implementation, the environment 800 further includes a predetermined representation instruction set 830 that is configured with instructions executable by a processor to generate a 3D representation 836 (e.g., a PIFu mesh) that represents a 3D shape and appearance of a user's upper body torso, head, and face for multiple points in time during the enrollment process from the enrollment data 824 (e.g., enrollment images 826). For example, the predetermined representation instruction set 830 acquires enrollment data 824 such as light intensity image data (e.g., RGB data from light intensity camera), depth image data (e.g., depth image data from a depth from depth camera such as infrared or time-of-flight sensor), and other sources of physical environment information (e.g., camera positioning information such as position and orientation data, e.g., pose data, from position sensors) of a user in a physical environment (e.g., user 25 in the physical environment 105 of FIG. 1), and generates representation data 832 (e.g., muscle activations, geometric shapes, latent spaces for facial expressions, etc.). Additionally, the predetermined representation instruction set 830 determines reference data 834 that associates the representation data 832 with a 3D reference point defined relative to a skeletal representation of the user (e.g., 3D reference point 510 of FIG. 5). For example, the 3D representation 836 may be generated using a PI Fu technique that locally aligns pixels of 2D enrollment images 826 with a global context to form the 3D representation 836 (also referred to as a PI Fu mesh). The 3D representation 836 (e.g., representation 200 of FIG. 2) includes a plurality of vertices and polygons that may be determined at an enrollment process based on image data, such as RGB data and depth data.

In an example implementation, the environment 800 includes a frame-specific representation instruction set 840 that is configured with instructions executable by a processor to generate representation data 842, which may include a set of values (e.g., appearance values, depth values, etc.) that represent a 3D shape and appearance of a user's face at a point in time from the live image data (e.g., sensor data 815). For example, the frame-specific representation instruction set 840 acquires sensor data 815 from sensors 812 such as light intensity image data (e.g., RGB data from light intensity camera), depth image data (e.g., depth image data from a depth from depth camera such as infrared or time-of-flight sensor), and other sources of physical environment information (e.g., camera positioning information such as position and orientation data, e.g., pose data, from position sensors) of a user in a physical environment (e.g., user 25 in the physical environment 105 of FIG. 1), and generates parameterization data (e.g., muscle activations, geometric shapes, latent spaces for facial expressions, etc.) for face parameterization for the representation data 842. For example, the parameterization data can be represented by the parameterization image 846 (e.g., parametrization image 320 discussed herein with respect to FIG. 3B) by changing parameters such as appearance values such as texture data, color data, opacity, etc., and depth values of different point of the face based on sensor data 815. Face parameterization techniques for frame-specific representation instruction set 840 may include taking partial views acquired from the sensor data 815 and determining from a geometric model small sets of parameters (e.g., the muscles of the face) to update the user representation. For example, the geometric model may include sets of data for the eyebrows, the eyes, the cheeks below the eyes, the mouth area, the chin area, etc. The parameterization tracking of the frame-specific representation instruction set 840 may provide geometry of the facial features of the user. Additionally, the frame-specific representation instruction set 840 determines reference data 844 that associates the representation data 842 with a 3D reference point defined relative to a skeletal representation of the user (e.g., 3D reference point 510 of FIG. 5).

In an example implementation, the environment 800 further includes a combined representation instruction set 850. In an exemplary implementation, the combined representation instruction set 850 is located at a receiving device for displaying a combined representation, and the sensors 812 and the other instruction sets (e.g., enrollment instruction set 820, the predetermined representation instruction set 830, and the frame-specific representation instruction set 840) are located at another device (e.g., the device of a user who's avatar will be generated at the receiving device that combines the representation data). Alternatively, in some embodiments, the combined representation instruction set 850, the sensors 812 and the other instruction sets (e.g., enrollment instruction set 820, the predetermined representation instruction set 830, and the frame-specific representation instruction set 840) are located at another device (e.g., a sending device), such that a receiving device would receive the data for the combined representation from the other device for display.

The combined representation instruction set 850 is configured with instructions executable by a processor to generate a representation of a user (e.g., a 3D avatar) based on combining the representation data 832 and the reference data 834 based on aligning (e.g., via the alignment module 852) a 3D reference point provided by the reference data 834, 844. The alignment module 852 provides instructions to identify the 3D reference points in both the reference data 834 and the reference data 844 in order to align the data sets. Additionally, the combined representation instruction set 850 is configured with instructions executable by a processor to display the portions of the representation based on the corresponding aligned data as they are updated with the representation data 842 (e.g., as live image data is acquired and processed by the frame-specific representation instruction set 840 from another device). For example, the combined representation instruction set 850 acquires the representation data 832 (e.g., a PI Fu mesh) from the predetermined representation instruction set 830, acquires the representation data 842 (e.g., updated appearance values and depth values from live image data) from the frame-specific representation instruction set 840, and generates combined representation data 854 (e.g., a real-time representation of a user, such as a 3D avatar). For example, the frame-specific representation instruction set 840 can produce the representation data 842 and generate the parameterization image 846 (e.g., avatar 735 of FIG. 7).

In some implementations, the combined representation instruction set 850 may be repeated for each frame captured during each instant/frame of a live communication session or other experience. For example, for each iteration, while the user is using the device (e.g., wearing the HMD), the example environment 800 may involve continuously obtaining the representation data 842 (e.g., appearance values and depth values), and for each frame, update the displayed portions of the 3D representation 856 based on updated values. For example, for each new frame of parameterization data, the system can update the display of the 3D avatar based on the new data.

Figure 9:
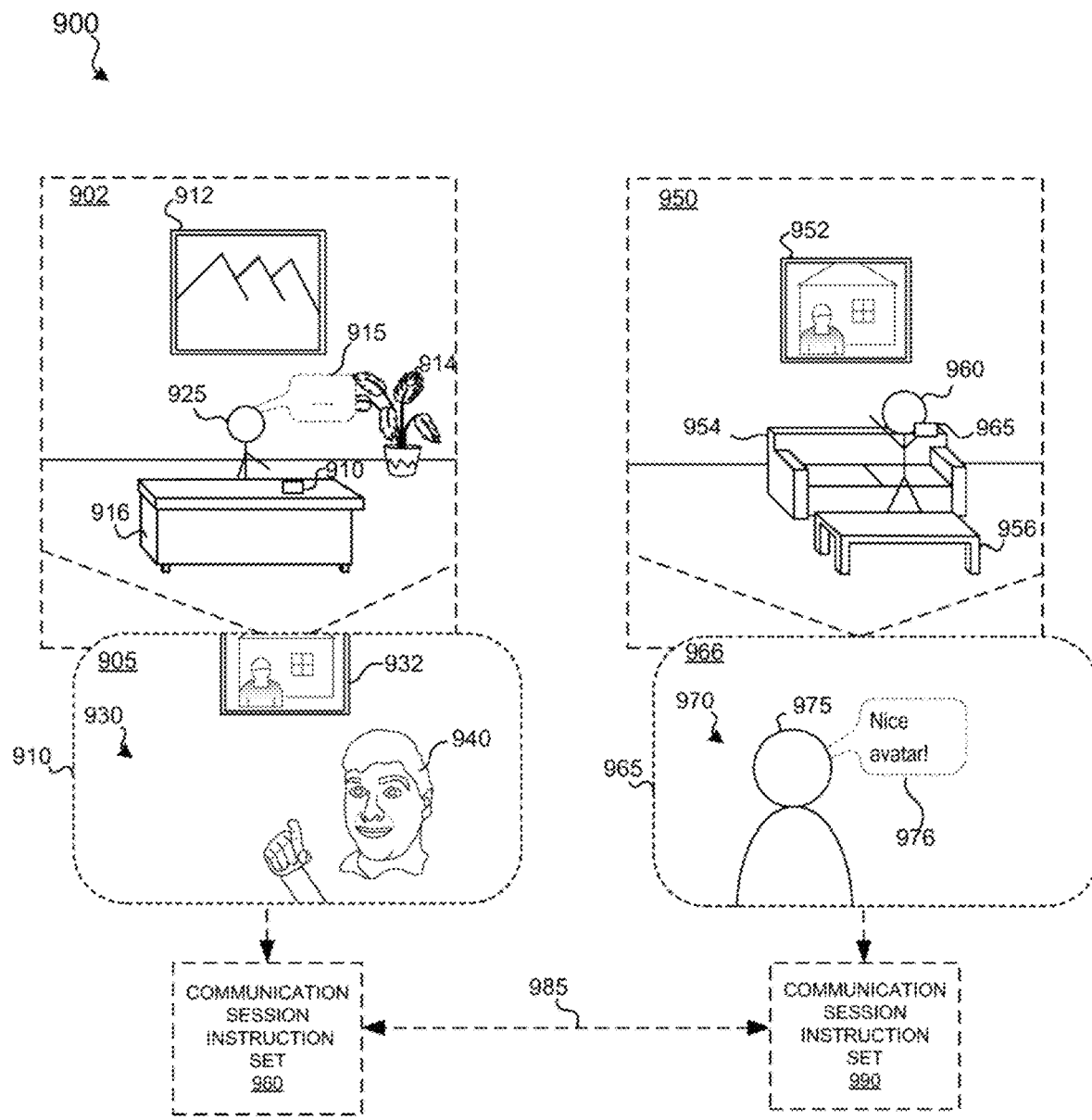
FIG. 9 illustrates exemplary electronic devices operating in different physical environments during a communication session of a first user at a first device and a second user at a second device with a view of a 3D representation of the second user for the first device in accordance with some implementations.

FIG. 9 illustrates exemplary electronic devices operating in different physical environments during a communication session of a first user at a first device and a second user at a second device with a view of a 3D representation of the second user for the first device in accordance with some implementations. In particular, FIG. 9 illustrates exemplary operating environment 900 of electronic devices 910, 965 operating in different physical environments 902, 950, respectively, during a communication session, e.g., while the electronic devices 910, 965 are sharing information with one another or an intermediary device such as a communication session server. In this example of FIG. 9, the physical environment 902 is a room that includes a wall hanging 912, a plant 914, and a desk 916. The electronic device 910 includes one or more cameras, microphones, depth sensors, or other sensors that can be used to capture information about and evaluate the physical environment 902 and the objects within it, as well as information about the user 925 of the electronic device 910. The information about the physical environment 902 and/or user 925 may be used to provide visual content (e.g., for user representations) and audio content (e.g., for text transcription) during the communication session. For example, a communication session may provide views to one or more participants (e.g., users 925, 960) of a 3D environment that is generated based on camera images and/or depth camera images of the physical environment 902, a representation of user 925 based on camera images and/or depth camera images of the user 925, and/or text transcription of audio spoken by a user (e.g., a transcription bubble). As illustrated in FIG. 9, user 925 is speaking to user 960 as shown by spoken words 915.

In this example, the physical environment 950 is a room that includes a wall hanging 952, a sofa 954, and a coffee table 956. The electronic device 965 includes one or more cameras, microphones, depth sensors, or other sensors that can be used to capture information about and evaluate the physical environment 950 and the objects within it, as well as information about the user 960 of the electronic device 965. The information about the physical environment 950 and/or user 960 may be used to provide visual and audio content during the communication session. For example, a communication session may provide views of a 3D environment that is generated based on camera images and/or depth camera images (from electronic device 965) of the physical environment 950 as well as a representation of user 960 based on camera images and/or depth camera images (from electronic device 965) of the user 960. For example, a 3D environment may be sent by the device 910 by a communication session instruction set 980 in communication with the device 965 by a communication session instruction set 990 (e.g., via network connection 985). As illustrated in FIG. 9, the audio spoken by user 925 (e.g., spoken words 915) is transcribed (e.g., via communication instruction set 990) at device 965 (or via remote server), and the view 966 provides user 960 with a text transcription of audio spoken by the speaker (user 925) via the transcription bubble 976 (e.g., "Nice avatar!").

FIG. 9 illustrates an example of a view 905 of a virtual environment (e.g., 3D environment 930) at device 910, where a representation 932 of the wall hanging 952 and a user representation 940 is provided (e.g., an avatar of user 960), provided there is a consent to view the user's representations of each user during a particular communication session. In particular, the user representation 940 of user 960 is generated based on the combined user representation techniques described herein (e.g., for a more realistic avatar generated in real time). Additionally, the electronic device 965 within physical environment 950 provides a view 966 that enables user 960 to view a representation 975 (e.g., an avatar) of at least a portion of the user 925 (e.g., from mid-torso up) within the 3D environment 970 with a transcription of the words spoken by the user 925 via the transcription bubble 976 (e.g., "Nice avatar!"). In other words, the more realistic looking avatar (e.g., user representation 940 of user 960) is generated at device 910 by generating combined 3D representations of the user 960 for the multiple instants in a period of time based on data obtained from device 965 (e.g., a predetermined 3D representation of user 960 and a respective frame-specific 3D representation of user 960). Alternatively, in some embodiments, user representation 940 of user 960 is generated at device 965 (e.g., sending device of a speaker) and sent to device 910 (e.g., viewing device to view an avatar of the speaker). In particular, each of the combined 3D representations 940 of user 960 is generated by combining a predetermined 3D representation of user 960 with a respective frame-specific 3D representation of user 960 based on an alignment (e.g., aligning a 3D reference point) according to techniques described herein.

In the example of FIG. 9, the electronic devices 910 and 965 are illustrated as hand-held devices. The electronic devices 910 and 965 may be a mobile phone, a tablet, a laptop, so forth. In some implementations, electronic devices 910 and 965 may be worn by a user. For example, electronic devices 910 and 965 may be a watch, a head-mounted device (HMD), head-worn device (glasses), headphones, an ear mounted device, and so forth. In some implementations, functions of the devices 910 and 965 are accomplished via two or more devices, for example a mobile device and base station or a head mounted device and an ear mounted device. Various capabilities may be distributed amongst multiple device, including, but not limited to power capabilities, CPU capabilities, GPU capabilities, storage capabilities, memory capabilities, visual content display capabilities, audio content production capabilities, and the like. The multiple devices that may be used to accomplish the functions of electronic devices 910 and 965 may communicate with one another via wired or wireless communications. In some implementations, each device communicates with a separate controller or server to manage and coordinate an experience for the user (e.g., a communication session server). Such a controller or server may be located in or maybe remote relative to the physical environment 902 and/or physical environment 950.

Additionally, in the example of FIG. 9, the 3D environments 930 and 970 are an XR environments that are based on a common coordinate system that can be shared with other users (e.g., a virtual room for avatars for a multi-person communication session). In other words, the common coordinate system of the 3D environments 930 and 970 are different than the coordinate system of the physical environments 902 and 950, respectively. For example, a common reference point may be used to align the coordinate systems. In some implementations, the common reference point may be a virtual object within the 3D environment that each user can visualize within their respective views. For example, a common center piece table that the user representations (e.g., the user's avatars) are positioned around within the 3D environment. Alternatively, the common reference point is not visible within each view. For example, a common coordinate system of a 3D environment may use a common reference point for positioning each respective user representation (e.g., around a table/desk). Thus, if the common reference point is visible, then each view of the device would be able to visualize the "center" of the 3D environment for perspective when viewing other user representations. The visualization of the common reference point may become more relevant with a multi-user communication session such that each user's view can add perspective to the location of each other user during the communication session.

In some implementations, the representations of each user may be realistic or unrealistic and/or may represent a current and/or prior appearance of a user. For example, a photorealistic representation of the user 925 or 960 may be generated based on a combination of live images and prior images of the user. The prior images may be used to generate portions of the representation for which live image data is not available (e.g., portions of a user's face that are not in view of a camera or sensor of the electronic device 910 or 965 or that may be obscured, for example, by a headset or otherwise). In one example, the electronic devices 910 and 965 are head mounted devices (HMD) and live image data of the user's face includes a downward facing camera that obtains images of the user's cheeks and mouth and inward facing camera images of the user's eyes, which may be combined with prior image data of the user's other portions of the user's face, head, and torso that cannot be currently observed from the sensors of the device. Prior data regarding a user's appearance may be obtained at an earlier time during the communication session, during a prior use of the electronic device, during an enrollment process used to obtain sensor data of the user's appearance from multiple perspectives and/or conditions, or otherwise.

Some implementations provide a representation of at least a portion of a user within a 3D environment other than the user's physical environment during a communication session and, based on detecting a condition, provide a representation of another object of the user's physical environment to provide context. For example, during a communication session, representations of one or more other objects of the physical environment may be displayed in the view. For example, based on determining that the user 925 is interacting with a physical object in physical environment 902, a representation (e.g., realistic or proxy) may be displayed in a view to provide context for the interaction of the user 925. For example, if the first user 925 picks up an object, such as a family picture frame, to show to another user, a view may include a realistic view of the picture frame (e.g., live video). Thus, while displaying an XR environment, the view may present a virtual object that represents the user picking up a generic object, display a virtual object that is similar to a picture frame, display previous acquired image(s) of the actual picture frame from the obtained 3D scan, or the like.

Figure 10:
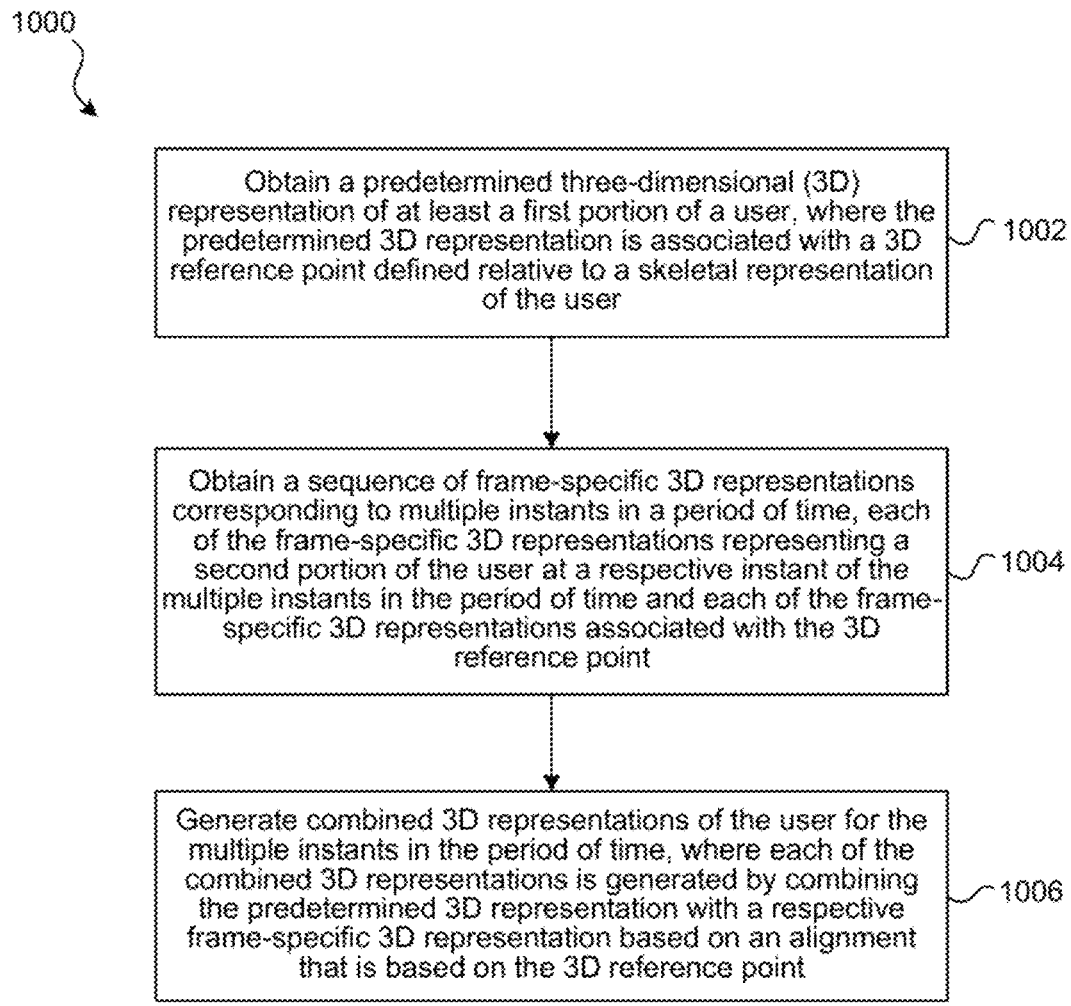
FIG. 10 is a flowchart representation of a method for generating a combined 3D representation of a user for multiple instants in a period of time based on an alignment based on a 3D reference point in accordance with some implementations.

FIG. 10 is a flowchart illustrating an exemplary method 1000. In some implementations, a device (e.g., device 10 of FIG. 1 or device 965 of FIG. 9) performs the techniques of method 1000 to generate a combined 3D representation of a user for multiple instants in a period of time based on an alignment based on a 3D reference point. In some implementations, the techniques of method 1000 are performed on a mobile device, desktop, laptop, HMD, or server device. In some implementations, the method 1000 is performed on processing logic, including hardware, firmware, software, or a combination thereof. In some implementations, the method 1000 is performed on a processor executing code stored in a non-transitory computer-readable medium (e.g., a memory).

In some implementations, the method 1000 is implemented at a processor of a device, such as a viewing device, that renders the combined 3D representation (e.g., device 910 of FIG. 9 renders 3D representation 940 of user 960 (an avatar) from data obtained from device 965).

At block 1002, the method 1000 obtains a predetermined three-dimensional (3D) representation of at least a first portion of a user, wherein the predetermined 3D representation is associated with a 3D reference point defined relative to a skeletal representation of the user. For example, the predetermined 3D representation may represent an upper body and a head of a user. The predetermined 3D representation may be generated using a pixel-aligned implicit function (PIFu) technique that locally aligns pixels of 2D enrollment images with a global context to form the predetermined 3D representation (e.g., representation 200 of FIG. 2).

In some implementations, the 3D reference point is associated with a 3D position of an atlas joint of a skeletal representation of the user. For example, the 3D reference point maybe the head/atlas joint that may be determined by tracking an x-Axis aligned to the ear canals and/or a z-axis on a Frankfurt plane. In some implementations, the 3D reference point is associated with the center of the eyes of the user defined at a position at an offset from the atlas joint. For example, during an enrollment process, an offset may be determined which provides mid-pupil origin for a parameterization grid. In some implementations, the 3D reference point may be a point centered between the user's eyes based on the skeleton's atlas joint and user-specific head-shape characteristics (e.g., offset location of the 3D reference point 510 associated with a determined location of the atlas joint 520 based on the offset 515 in FIGS. 5A and 5B).

At block 1004, the method 1000 obtains a sequence of frame-specific 3D representations corresponding to multiple instants in a period of time, each of the frame-specific 3D representations representing a second portion of the user at a respective instant of the multiple instants in the period of time and each of the frame-specific 3D representations associated with the 3D reference point. For example, each frame-specific 3D representation may represent a face of the user, thus the first and the second portions may overlap and represent some common areas of the user.

In some implementations, the second portion of the user is a sub-portion (e.g., just the face) of the first portion (e.g., that already represents the face). In some implementations, the first portion of the user includes a face portion and an additional portion of the user, and the second portion of the user includes the face portion without the additional portion of the user.

In some implementations, each frame-specific 3D representation may be generated based on sensor data captured by a sending device during a communication (e.g., co-presence) session. In some implementations, each frame-specific 3D representation may be generated using sensor data from inward/down facing cameras & enrollment data, e.g., images of face in different expressions, images of portions of the face that cannot be captured while the user is wearing an HMD or cannot be captured otherwise during live use. In some implementations, each frame-specific 3D representation may represent the user face using a curved parameterization grid positioned relative to the 3D reference point.

In some implementations, the sequence of frame-specific 3D representations corresponding to multiple instants in a period of time is based on generating a set of values representing the user based on sensor data, where the set of values (e.g., parameterization values) may include: i) depth values that define 3D positions of portions of the user relative to multiple 3D positions of points of a projected surface, and ii) appearance values that define appearances of the portions of the user. For example, generating a set of values (e.g., RGB values, alpha values, and depth values—RGBDA) that represent the user based on the sensor data may involve using both live sensor data from inward/down facing cameras and enrollment data, e.g., images of a face in different expressions without wearing an HMD. In some implementations, generating the set of values may involve using a machine learning model trained to produce the set of values.

The set of values may include depth values that define 3D positions of portions of the user relative to multiple 3D positions of points of a projected surface. For example, a depth value of one point may define that a portion of the face is at depth D1 behind that point's position on the surface, e.g., at depth D1 along an orthogonal ray starting at that point (e.g., ray 332 of FIG. 3B). In some implementations, the depth values define a distance between a portion of the user and a corresponding point of the projected surface positioned along an orthogonal ray normal to the projected surface at a position of the corresponding point. The techniques described herein uses depth values that are different than the depth values in existing RGBDA images, which define content depth relative to a single camera location. The appearance values may include values such as RGB data and alpha data that define appearances of the portions of the user. For example, the appearance values may include color, texture, opacity, etc.

In some implementations, the term "surface" refers to a 2D manifold that may be planar or non-planar. In some implementations, the points of the surface (e.g., the surface of the 2D manifold) are spaced at regular intervals along vertical and horizontal lines on the surface. In some implementations, the points are regularly spaced along vertical and horizontal grid lines on a partially-cylindrical surface as illustrated in FIGS. 3A and 3B. Alternatively, other planar and non-planar surfaces may be utilized. For example, the planar surface of a cylindrical surface may be oriented/curved about a different axis. Additionally, or alternatively, the planar surface may be a hemispherical manifold. In some implementations, the points may be unevenly distributed across the surface of the 2D manifold, such as not regularly spaced along vertical and horizontal grid lines about a surface but may be focused on particular area(s) of the user's face. For example, some areas can have more points where there might be more detail/movement in the face's structure, and some points can have fewer points in areas where there might be less detail/movement, like a forehead (less detail) and nose (doesn't move much). For example, a higher density of points may be around the eyes and the mouth.

In some implementations, the set of values is generated based on an alignment such that a subset of the points on a central area of the surface correspond to a central portion of a face of the user. For example, as illustrated in FIG. 3B, the focused region of the nose of the user at area 330, the feature point of ray 332 is the tip of the nose of the person.

In some implementations, generating the set of values is further based on images of a face of the user captured in different poses, and/or while the user is expressing a plurality of different facial expressions. For example, the set of values is determined based on enrollment images of the face while the user is facing toward the camera, to the left of the camera, and to the right of the camera, and/or while the user is smiling, brows raised, cheeks puffed out, etc. In some implementations, the sensor data corresponds to only a first area of the user (e.g., parts not obstructed by the device, such as an HMD), and the set of image data (e.g., enrollment data) corresponds to a second area including a third area different than the first area. For example, a second area may include some of the parts obstructed by an HMD when it is being worn by the user.

In some implementations, determining the parameterizations that are specific to a user (e.g., generating the set of values), may be adapted to each specific user. For example, the parameterizations may be either fixed based on an enrollment identity (e.g., to better cover a person's head size or nose shape), or the parameterizations may be based on a current expression (e.g., when the mouth opens the parametrization may get longer). In an exemplary implementation, the method 1000 may further include obtaining additional sensor data of a user associated with a second period of time, updating the set of values representing the user based on the additional sensor data for the second period of time, and providing the updated set of values, where the depiction of the user is updated at the second period of time based on the updated set of values (e.g., updating the user of values based on a current expression, such that when the mouth opens the parametrization also gets longer).

In some implementations, generating the set of values representing the user is a based on a machine learning model trained to produce the set of values. For example, the process for generating the representation data 832 of the predetermined representation instruction set 830 and/or the parameterization data of the frame-specific representation instruction set 840 is provided by a machine learning model (e.g., a trained neural network) to identify patterns in the textures (or other features) in the enrollment data 822 and the sensor data 815 (live image data such as images 816). Moreover, the machine learning model may be used to match the patterns with learned patterns corresponding to the user 25 such as smiling, frowning, talking, etc. For example, when a pattern of smiling is determined from the showing of the teeth, there may also be a determination of other portions of the face that also change for the user when he or she smiles (e.g., cheek movement, eyebrows, etc.). In some implementations, the techniques described herein may learn patterns specific to the particular user 25 of FIG. 1.

At block 1006, the method 1000 generates combined 3D representations of the user for the multiple instants in the period of time, wherein each of the combined 3D representations is generated by combining the predetermined 3D representation with a respective frame-specific 3D representation based on an alignment, wherein the alignment is based on the 3D reference point. In some implementations, the frame-specific 3D representations may each represent a second portion of the user that is a sub-portion (e.g., just the face) of the first portion (e.g., that already represents the face) so that the frame-specific 3D representations can be combined with the predetermined 3D representation by simply adjusting that sub-portion (e.g., face portion) of the predetermined 3D representation.

In some implementations, obtaining the frame-specific 3D representations may involve adjusting the positions of some of the predetermined 3D representation's vertices and then applying texture/color based on each of the frame-specific 3D representations. This can deform and color the predetermined sub-portion (e.g., face) to correspond with the real-time shape and color of that portion (e.g., face) of the user at each of the instants in time.

In some implementations, in which the frame-specific 3D representations are defined using a parameterization grid (e.g., a heightfield map), the combining of the data may be facilitated by mapping the vertices of the predetermined 3D representation to positions on the parameterization grid based on the 3D reference point (e.g., 3D reference points 602 and 624 of FIG. 6). The mapping using the 3D reference point enables the frame-specific face data specified on the parameterization grid to be directly used to adjust the positions of the vertices of the predetermined 3D representation. In some implementations, the positions of the vertices may be adjusted (e.g., using specified alpha values) by blending their predetermined vertex positions with their frame-specific data vertex positions. In other words, the predetermined 3D representation vertices may be mapped onto the parameterization grid, the parameterization grid may be adjusted using the live face data, and the adjusted parameterization grid represents a combined 3D representation of the user combining the predetermined 3D representation with one of the frame-specific 3D representations.

In some implementations, the mapping may be determined during an enrollment process.

In some implementations, combining the predetermined 3D representation with the respective frame-specific 3D representations includes adjusting a sub-portion (e.g., face portion) of the predetermined 3D representation. In some implementations, adjusting the sub-portion of the predetermined 3D representation includes adjusting positions of vertices of the predetermined 3D representation and applying texture based on each of the frame-specific 3D representations. For example, the adjusting may deform and color the predetermined sub-portion (e.g., face) to correspond with the real-time shape and color of that portion (e.g., face) of the user at each of the instants in time.

In some implementations, the method 1000 may further include rendering view of the combined 3D representations. In some implementations, as illustrated in FIG. 9, the rendering occurs during a communication session in which a second device (e.g., device 965) captures sensor data (e.g., image data of user 960 and a portion of the environment 950) and provides a sequence of frame-specific 3D representations corresponding to the multiple instants in the period time based on the sensor data. For example, the second device 965 provides/transmits the sequence of frame-specific 3D representations to device 910, and device 910 generates the combined 3D representation to display a live 3D video-like face depiction (e.g., a realistic moving avatar) of the user 960 (e.g., representation 940 of user 960). Alternatively, in some implementations, the second device provides the predetermined 3D representation of the user (e.g., representation 940 of user 960) during the communication session (e.g., a realistic moving avatar). For example, the combined representation is determined at device 965 and sent to device 910. In some implementations, the views of the combined 3D representations are displayed on the device (e.g., device 910) in real-time relative to the multiple instants in the period of time. For example, the depiction of the user is displayed in real-time (e.g., an avatar shown to a second user on a display of a second device of the second user).

In some implementations, providing the set of values includes sending a sequence of frames of 3D video data including a frame including the set of values during a communication session with a second device, wherein the second device renders an animated depiction of the user based on the sequence of frames of 3D video data. For example, the set of points may be a frame of 3D video data sent during a communication session with another device and the other device uses the set of values (along with information regarding how to interpret the depth values) to render a view of the face of the user. Additionally, or alternatively, sequential frames of face data (sets of values representing the 3D shape and appearance of the user's face at different points in time) may be transmitted and used to display a live 3D video-like face depiction.

In some implementations, the depiction of the user may include sufficient data to enable a stereo view of the user (e.g., left/right eye views) such that the face may be perceived with depth. In one implementation, a depiction of a face includes a 3D model of the face and views of the representation from a left eye position and a right eye position and are generated to provide a stereo view of the face.

In some implementations, certain parts of the face that may be of importance to conveying a realistic or honest appearance, such as the eyes and mouth, may be generated differently than other parts of the face. For example, parts of the face that may be of importance to conveying a realistic or honest appearance may be based on current camera data while other parts of the face may be based on previously-obtained (e.g., enrollment) face data.

In some implementations, a representation of a face is generated with texture, color, and/or geometry for various face portions identifying an estimate of how confident the generation technique is that such textures, colors, and/or geometries accurately correspond to the real texture, color, and/or geometry of those face portions based on the depth values and appearance values each frame of data. In some implementations, the depiction is a 3D avatar. For example, the representation is a 3D model that represents the user (e.g., user 25 of FIG. 1).

In some implementations, the predetermined 3D representation and/or the sequence of frame-specific 3D representations are based on obtaining sensor data of a user. For example, the sensor data (e.g., live data, such as video content that includes light intensity data (RGB) and depth data), is associated with a point in time, such as images from inward/down facing sensors while the user is wearing an HMD associated with a frame (e.g., sensors 35a, 35b, 35c shown in FIG. 1). In some implementations, the sensor data includes depth data (e.g., infrared, time-of-flight, etc.) and light intensity image data obtained during a scanning process.

In some implementations, obtaining sensor data may include obtaining a first set of data (e.g., enrollment data) corresponding to features (e.g., texture, muscle activation, shape, depth, etc.) of a face of a user in a plurality of configurations from a device (e.g., enrollment image data 710 of FIG. 7). In some implementations, the first set of data includes unobstructed image data of the face of the user. For example, images of the face may be captured while the user is smiling, brows raised, cheeks puffed out, etc. In some implementations, enrollment data may be obtained by a user taking the device (e.g., an HMD) off and capturing images without the device occluding the face or using another device (e.g., a mobile device) without the device (e.g., HMD) occluding the face. In some implementations, the enrollment data (e.g., the first set of data) is acquired from light intensity images (e.g., RGB image(s)). The enrollment data may include textures, muscle activations, etc., for most, if not all, of the user's face. In some implementations, the enrollment data may be captured while the user is provided different instructions to acquire different poses of the user's face. For example, the user may be instructed by a user interface guide to "raise your eyebrows," "smile," "frown," etc., in order to provide the system with a range of facial features for an enrollment process.

In some implementations, obtaining sensor data may include obtaining a second set of data corresponding to one or more partial views of the face from one or more image sensors while a user is using (e.g., wearing) an electronic device (e.g., HMD). For example, obtaining sensor data includes live image data 720 of FIG. 7. In some implementations, the second set of data includes partial images of the face of the user and thus may not represent all of the features of the face that are represented in the enrollment data. For example, the second set of images may include an image of some of the foreface/brow eyes (e.g., facial feature characteristic data 40a) from an upward-facing sensor (e.g., sensor 35a of FIG. 1). Additionally, or alternatively, the second set of images may include an image of some of the eyes (e.g., eye gaze characteristic data 40b) from an inward-facing sensor (e.g., sensor 35a of FIG. 1). Additionally, or alternatively, the second set of images may include an image of some of the cheeks, mouth and chin (e.g., facial feature characteristic data 40c) from a downward facing sensor (e.g., sensor 35c of FIG. 1). In some implementations, the electronic device includes a first sensor (e.g., sensor 35a of FIG. 1) and a second sensor (e.g., sensor 35c of FIG. 1), where the second set of data is obtained from at least one partial image of the face of the user from the first sensor from a first viewpoint (e.g., upper facial characteristic data 40a) and from at least one partial image of the face of the user from the second sensor from a second viewpoint (e.g., lower facial characteristic data 40c) that is different than the first viewpoint (e.g., multiple IFC cameras to capture different viewpoints of the user's facial and body movements).

In some implementations, the method 1000 may be repeated for each frame captured during each instant/frame of a live communication session or other experience. For example, for each iteration, while the user is using the device (e.g., wearing the HMD), the method 1000 may involve continuously obtaining live sensor data (e.g., eye gaze characteristic data and facial feature data), and for each frame, updating the displayed portions of the representation based on the updated parameterization values of the sequence of frame-specific 3D representations (e.g., RGBDA values). For example, for each new frame, the system can update the parameterized values to update the display of the 3D avatar based on the new data.

Figure 11:
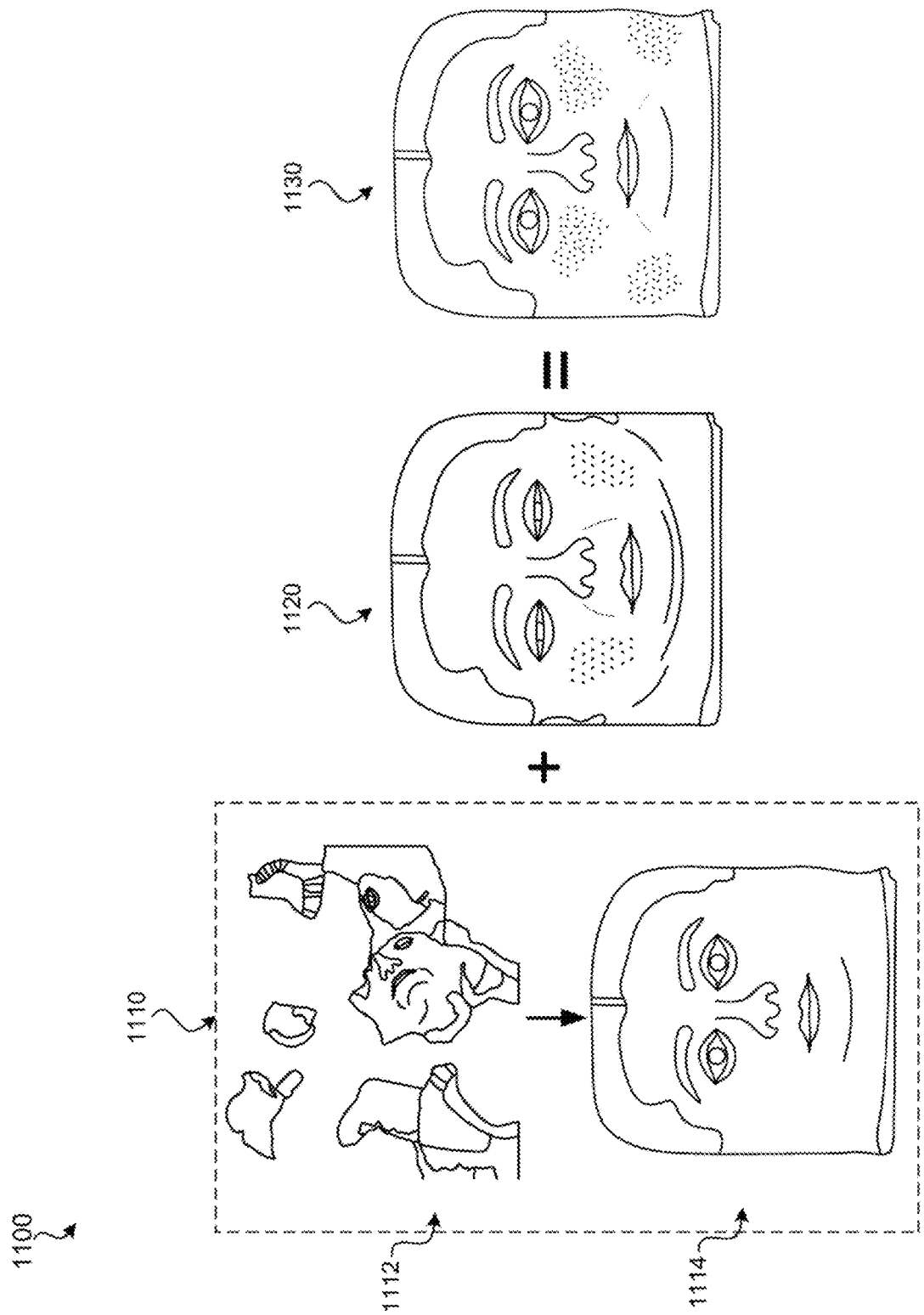
FIG. 11 illustrates an example of adjusting one or more colors of a first 3D representation based on colors in the first 3D representation and colors in a sample 3D representation.

FIG. 11 illustrates an example environment 1100 for implementing a process of adjusting one or more colors of a predetermined 3D representation based on colors in the predetermined 3D representation and colors in a sample 3D representation. The environment 1100 illustrates an adjustment of a color based on a combination of a predetermined 3D representation data 1110 (e.g., a PI FU based 3D representation of an upper body and head of a user) with frame-specific representation data 1120 (e.g., 3D representation data of a head/face of a user based on a parametrization grid that may be updated each frame) to generate the adjusted combined representation 1130 according to techniques described herein. The predetermined 3D representation data 1110 includes the incongruent representation data 1112 that can be transformed to the reconstructed representation data 1114. For example, incongruent representation data 1112 illustrates actual input texture data from a PI Fu algorithm which is disparate and can be difficult to correlate to other representation data. Thus, the incongruent representation data 1112 may be reconstructed as the reconstructed representation data 1114 which can then be mapped/combined with other representation data, such as the frame-specific representation data described herein. For example, a process may include adjusting the predetermined 3D representation (reconstructed representation data 1114) by adjusting one or more colors of the predetermined 3D representation based on colors in the predetermined 3D representation and colors in a frame-specific 3D representation (frame-specific representation data 1120). For example, the adjusting may be based on a transform (e.g., determined using the Monge-Kanorovich Color Transfer technique). In some implementations, determining such a transform may be facilitated by reconstructing the predetermined representation into the same space as the sample 3D reconstruction. In some implementations, adjusting the predetermined 3D representation includes generating a transform based on the predetermined 3D representation and the sample 3D representation. In some implementations, generating the transform includes computing a mean color of the first 3D representation corresponding to a part of the user, computing a second mean color of the sample 3D representation corresponding to the part of the user (e.g., the same part), and based on the first mean color and second mean color, deriving the transform, where the transform is a linear transformation matrix. For example, generating the transform may include applying a Monge-Kantorovich Color Transfer technique to derive a linear matrix, where the matrix maps the color from the PI Fu image to the parameterization-based image while retaining the details of the PIFu image. The use of the transform as described herein provides a result of a 3D representation that includes more congruous hair and skin color (e.g., a more realistic avatar).

Figure 12:
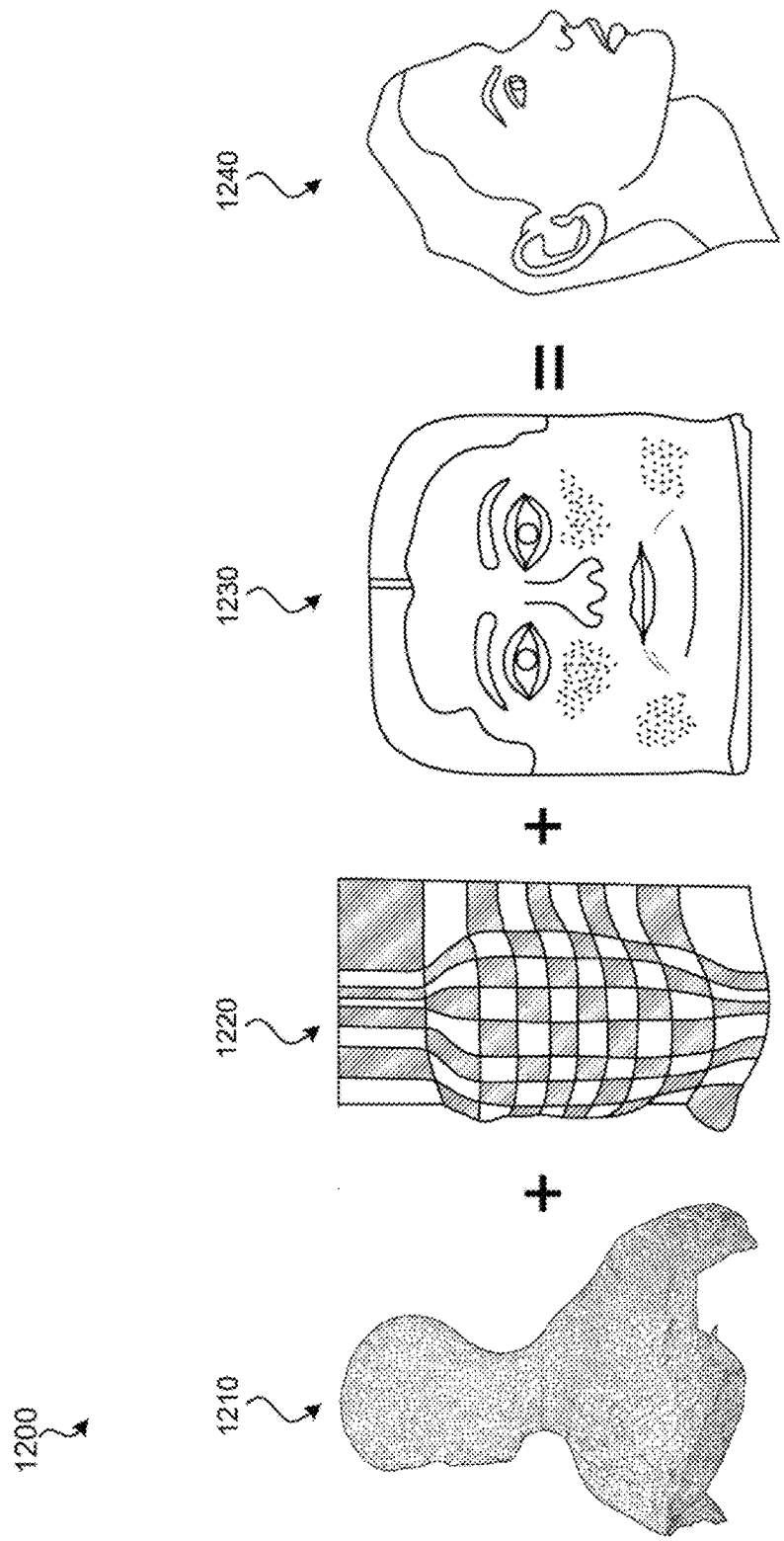
FIG. 12 illustrates an example of generating a 3D representation of a user based on the adjusting of one or more colors of a 3D representation of FIG. 10 in accordance with some implementations.

FIG. 12 illustrates an example environment 1200 for implementing a process of generating a 3D representation of a user based on the adjusting of one or more colors of a 3D representation of FIG. 10 in accordance with some implementations. The environment 1000 illustrates a color adjustment process for generating a combined representation 1240 based on utilizing predetermined 3D representation data 1210, frame-specific representation data 1220 (e.g., parameterization-based image (parameterization grid 622) or a height field map), and a color transform 1230 according to techniques described herein. For example, the process as illustrated in environment 1200 may include adjusting the colors of a first 3D representation of a first portion (e.g., head, hair, upper body, clothes, etc.) of a user determined via a first technique (e.g., PIFu—predetermined 3D representation data 1210). The colors may be adjusted using a sample 3D representation of a second portion of the user determined via a second, different technique such as the frame-specific representation data 1220 (e.g., a heightfield representation of a face). For example, face/hair in a sample capture at enrollment may be utilized. The color adjusting according to techniques described herein provides better color matching in combined 3D representations generated by combining the first 3D representations with one or more second 3D representations (e.g., frame-specific 3D representations) generated via the second technique (e.g., live sequence of frame-specific 3D representation data such as the set of values that represent a 3D shape and appearance of a user's face at a point in time as described herein). For example, the predetermined 3D representation data 1210 may be PI Fu-based and may be adjusted so that the neck color better matches the face color of the frame-specific 3D face representation 1220. Colors may be adjusted using a transform 1230 (e.g., determined using a Monge-Kanorovich Color Transfer technique, or the like). Determining the transform 1230 may be facilitated by reconstructing the predetermined 3D representation data 1210 into the same space as the frame-specific 3D face representation 1220. For example, the color transform 1230 may include reconstructing the PIFu representation in a UV space. This enables a more accurate transform based on comparing colors of the corresponding user parts.

In some implementations, a color adjustment is applied to other portions of the predetermined 3D representation data 1210, such as the hands of a user, where there is no overlap of data with the frame-specific representation data 1220 which may only correspond to the face and/or head of the user (e.g., the cylindrical 2D shape designed to update the facial features during a communication session). In some implementations, filtering techniques may be utilized to identify different parts of the frame-specific representation data 1220 corresponding to non-skin features (e.g., hair, clothing, etc.). In some implementations, filtering the frame-specific representation data 1220 includes identifying parts of the sample 3D representation corresponding to hair or clothing of the user. In some implementations, filtering the sample 3D representation includes excluding non-skin features from the filtered sample 3D representation. Such non-skin features may be identified via an algorithm or a machine learning model (e.g., using a semantic segmentation algorithm or model). In some implementations, filtering the sample 3D representation includes excluding parts of the sample 3D representation based on luminance (e.g., take only the top 25% to address the shadowing issue). In some implementations, adjusting the first 3D representation includes generating a transform based on the first 3D representation and the filtered sample 3D representation. In some implementations, adjusting the first 3D representation includes applying the transform to change each sub-portion (e.g., texel) of the first 3D representation (e.g., corrects the color of all parts of the hands).

In some implementations, an adjustment process further includes reconstructing the predetermined 3D representation data 1210 to use the same space as the frame-specific representation data 1220. In some implementations, reconstructing the first 3D representation includes generating a texture parameterization of the first 3D representation. In some implementations, the sample 3D representation includes 2D heightfield data representing a 3D appearance of the second portion, and reconstructing the predetermined 3D representation data 1210 which includes constructing a bounding volume hierarchy (BVH) of 2D UV positions and indices to map 2D coordinates of the heightfield of the sample 3D representation to sub-portions of the first 3D representation, and representing the first 3D representation in the 2D heightfield based on the constructing (e.g., utilizing "PIFu uvBVH" data—a BVH of 2D UV positions and indices). For example, uvBVH data may be used to map 2D UV coordinates to 3D triangle indices. The mapping 2D UV coordinates to 3D triangle indices allows to find the triangles that reference valid parts of the texture data of the first 3D representation. Additionally, the triangle indices may be utilized to map to the UV coordinates of the sample 3D representation, and reconstruct a 2D image for the first 3D representation (e.g., the PI Fu representation) that aligns with the sample 3D representation.

Figure 13:
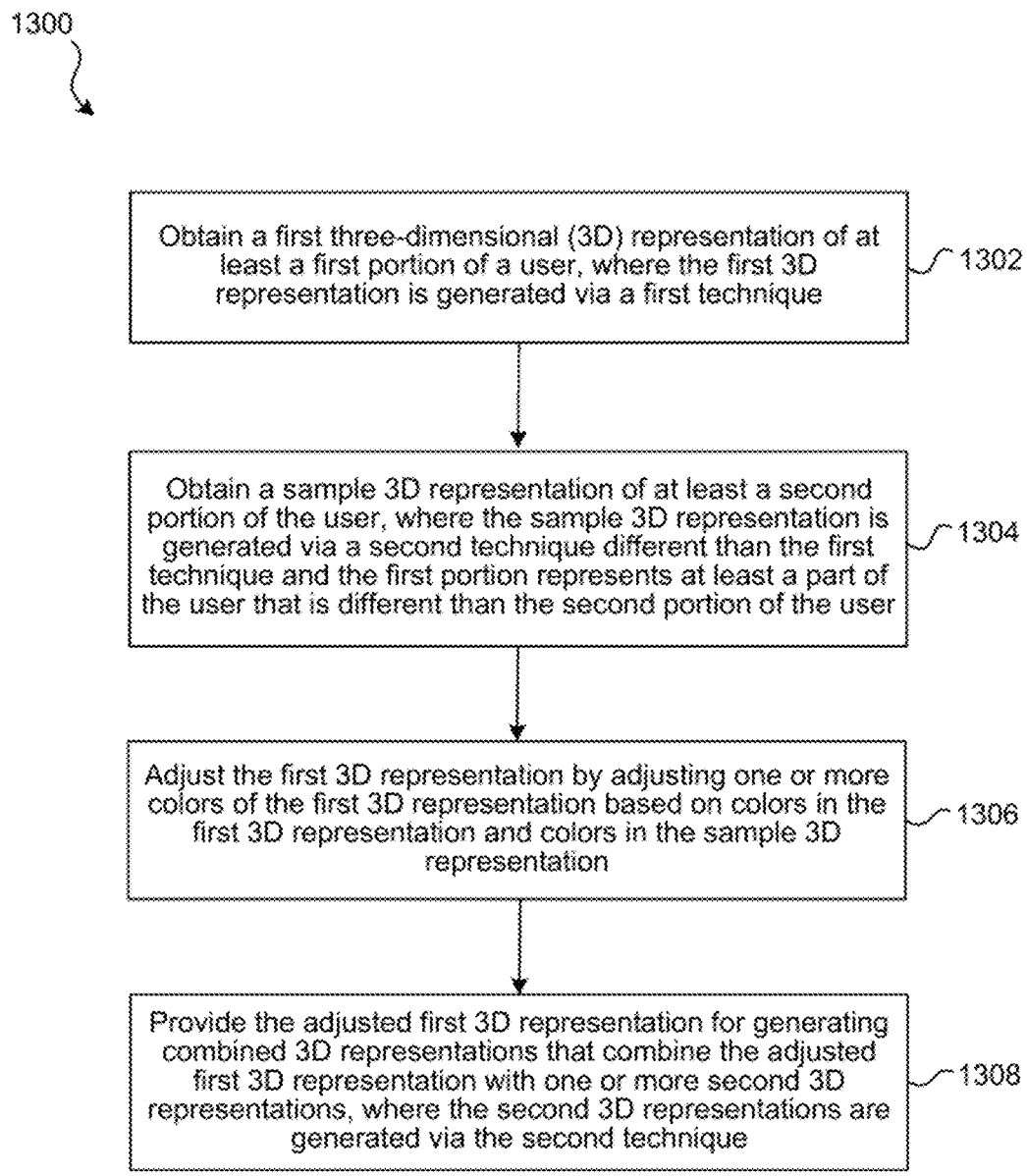
FIG. 13 is a flowchart representation of a method for adjusting one or more colors in a 3D representation for generating combined 3D representations in accordance with some implementations.

FIG. 13 is a flowchart illustrating an exemplary method 1300. In some implementations, a device (e.g., device 10 of FIG. 1 or device 965 of FIG. 9) performs the techniques of method 1300 for adjusting one or more colors in a 3D representation for generating combined 3D representations. In some implementations, the techniques of method 1300 are performed on a mobile device, desktop, laptop, HMD, or server device. In some implementations, the method 1300 is performed on processing logic, including hardware, firmware, software, or a combination thereof. In some implementations, the method 1300 is performed on a processor executing code stored in a non-transitory computer-readable medium (e.g., a memory).

In some implementations, the method 1300 is implemented at a processor of a device, such as a viewing device, that renders the combined 3D representation. For example, device 910 of FIG. 9 renders 3D representation 940 of user 960 (an avatar) from data obtained from device 965).

At block 1302, the method 1300 obtains a first 3D representation of at least a first portion of a user, where the first 3D representation is generated via a first technique. For example, the first 3D representation may represent an upper body and a head. In some implementations, the first 3D representation may be generated using a PIFu technique that locally aligns pixels of 2D enrollment images with a global context to form the first 3D representation.

At block 1304, the method 1300 obtains a sample 3D representation of at least a second portion of the user, where the sample 3D representation is generated via a second technique different than the first technique and the first portion represents at least a part (e.g., neck, clothes, etc.) of the user that is different than the second portion of the user (e.g., only face and hair). For example, the sample 3D representation may be a sample parameterization-based representation from enrollment (e.g., parameterization image 320) such as the frame-specific 3D representation data as discussed herein.

In some implementations, the first portion of the user represents a face, hair, neck, upper body, and/or clothes of the user and the second portion represents only the face and/or the hair of the user.

At block 1306, the method 1300 adjusts the first 3D representation by adjusting one or more colors of the first 3D representation based on colors in the first 3D representation and colors in the sample 3D representation. For example, the adjusting may be based on a transform (e.g., determined using the Monge-Kanorovich Color Transfer technique). In some implementations, determining such a transform may be facilitated by reconstructing the first representation into the same space as the sample 3D reconstruction.

In some implementations, adjusting the first 3D representation includes generating a transform based on the first 3D representation and the sample 3D representation. In some implementations, generating the transform includes computing a mean color of the first 3D representation corresponding to a part of the user, computing a second mean color of the sample 3D representation corresponding to the part of the user (e.g., the same part), and based on the first mean color and second mean color, deriving the transform, where the transform is a linear transformation matrix. For example, generating the transform may include applying a Monge-Kantorovich Color Transfer technique to derive a linear matrix, where the matrix maps the color from the PI Fu image to the parameterization-based image while retaining the details of the PIFu image. The use of the transform as described herein provides a result of a 3D representation that includes more congruous hair and skin color (e.g., a more realistic avatar).

In some implementations, adjusting the first 3D representation includes reconstructing the first 3D representation into the same space (e.g., the 2D heightfield space) as the sample 3D representation, determining a transform based on the reconstructed first 3D representation and the sample 3D representation, and adjusting the first 3D representation based on the transform. In some implementations, adjusting the first 3D representation includes applying the transform to change each sub-portion (e.g., texel) of the first 3D representation. For example, applying the transform may be utilized to correct the color of all portions of the 3D representation (e.g., corrects neck, clothes and other elements to avoid discontinuities in color since there is an assumption that the additional portions may need color correction as well).

At block 1308, the method 1300 provides the adjusted first 3D representation for generating combined 3D representations that combine the adjusted first 3D representation with one or more second 3D representations, wherein the second 3D representations are generated via the second technique. For example, the adjusted PI Fu data from enrollment is provided for use during live communication sessions where it is combined with frame-specific, live parameterization-based representation data, such as the frame-specific 3D representation data as discussed herein.

In some implementations, the method 1300 further includes reconstructing the first 3D representation to use the same space as the sample 3D representation. In some implementations, reconstructing the first 3D representation includes generating a texture parameterization of the first 3D representation. In some implementations, the sample 3D representation includes 2D heightfield data representing a 3D appearance of the second portion, and reconstructing the first 3D representation includes constructing a bounding volume hierarchy of 2D UV positions and indices to map 2D coordinates of the heightfield of the sample 3D representation to sub-portions of the first 3D representation, and representing the first 3D representation in the 2D heightfield based on the constructing (e.g., utilizing "PIFu uvBVH" data—a BVH of 2D UV positions and indices).

Figure 14:
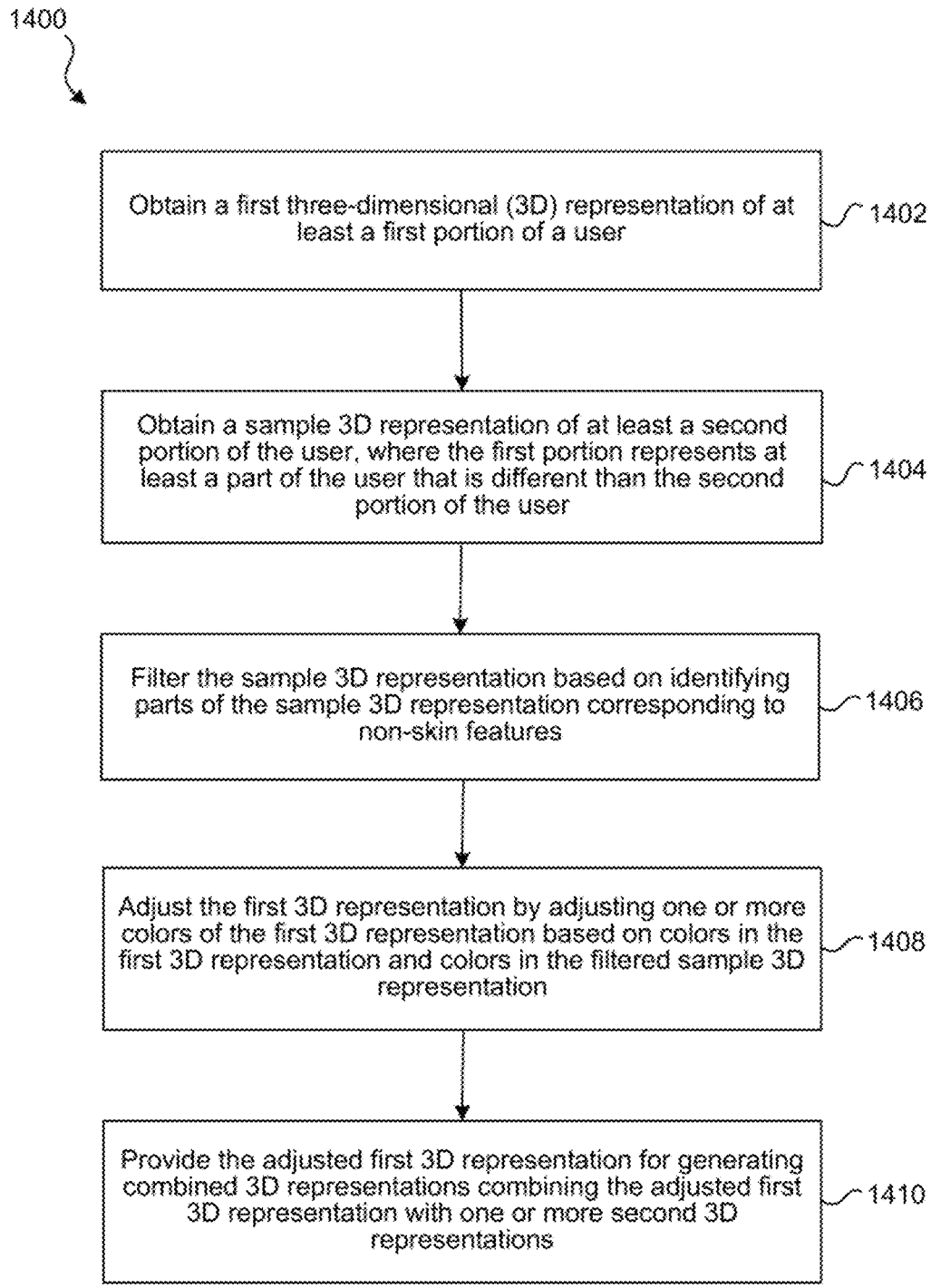
FIG. 14 is a flowchart representation of a method for adjusting one or more colors in a 3D representation for generating combined 3D representations based on filtering identified parts in accordance with some implementations.

FIG. 14 is a flowchart illustrating an exemplary method 1400. In some implementations, a device (e.g., device 10 of FIG. 1 or device 965 of FIG. 9) performs the techniques of method 1400 for adjusting one or more colors in a 3D representation for generating combined 3D representations based on filtering identified parts (e.g., filtering hands and clothes from the head/face of a user). In some implementations, the techniques of method 1400 are performed on a mobile device, desktop, laptop, HMD, or server device. In some implementations, the method 1400 is performed on processing logic, including hardware, firmware, software, or a combination thereof. In some implementations, the method 1400 is performed on a processor executing code stored in a non-transitory computer-readable medium (e.g., a memory).

In some implementations, the method 1400 is implemented at a processor of a device, such as a viewing device, that renders the combined 3D representation. For example, device 910 of FIG. 9 renders 3D representation 940 of user 960 (an avatar) from data obtained from device 965.

At block 1402, the method 1400 obtains a first 3D representation of at least a first portion of a user (e.g., hands). In some implementations, the first 3D representation is generated via a first technique. For example, the first 3D representation may represent an upper body, head, and hands. In some implementations, the first 3D representation may be generated using a PIFu technique that locally aligns pixels of 2D enrollment images with a global context to form the first 3D representation.

At block 1404, the method 1400 obtains a sample 3D representation of at least a second portion of the user, where the first portion represents at least a part (e.g., only hands) of the user that is different than the second portion of the user (e.g., only face and hair). In some implementations, the sample 3D representation is generated via a second technique different than the first technique. For example, the sample 3D representation may be a sample parameterization-based representation from enrollment (e.g., parameterization image 320) such as the frame-specific 3D representation data as discussed herein.

In some implementations, the first portion includes the hands of the user and the second portion includes the face and/or the hair of the user. In some implementations, the first portion and the second portion of the user do not overlap. For example, the first portion only includes the hands of the user, and the second portion only includes the face and/or the hair of the user.

At block 1406, the method 1400 filters the sample 3D representation based on identifying parts of the sample 3D representation corresponding to non-skin features (e.g., hair, clothing, etc.). In some implementations, filtering the sample 3D representation includes identifying parts of the sample 3D representation corresponding to hair or clothing of the user. In some implementations, filtering the sample 3D representation includes excluding non-skin features from the filtered sample 3D representation. In some implementations, filtering the sample 3D representation includes excluding parts of the sample 3D representation based on luminance (e.g., take the top 25% to address any shadowing issues).

At block 1408, the method 1400 adjusts the first 3D representation by adjusting one or more colors of the first 3D representation based on colors in the first 3D representation and colors in the filtered sample 3D representation. For example, the adjusting may be based on a transform (e.g., determined using the Monge-Kanorovich Color Transfer technique). In some implementations, determining such a transform may be facilitated by reconstructing the first representation into the same space as the sample 3D reconstruction.

In some implementations, adjusting the first 3D representation includes generating a transform based on the first 3D representation and the filtered sample 3D representation. In some implementations, adjusting the first 3D representation includes applying the transform to change each sub-portion (e.g., texel) of the first 3D representation (e.g., corrects the color of all parts of the hands).

At block 1408, the method 1400 provides the adjusted first 3D representation for generating combined 3D representations combining the adjusted first 3D representation with one or more second 3D representations. In some implementations, the second 3D representations are generated via the second technique. For example, the adjusted PIFu data from enrollment is provided for use during live communication sessions where it is combined with frame-specific, live parameterization-based representation data, such as the frame-specific 3D representation data as discussed herein (e.g., combining the hands and face for each frame).

In some implementations, the method 1400 further includes reconstructing the first 3D representation to use a same space as the sample 3D representation. In some implementations, reconstructing the first 3D representation includes generating a texture parameterization of the first 3D representation. In some implementations, the sample 3D representation includes 2D heightfield data representing a 3D appearance of the second portion, and reconstructing the first 3D representation includes constructing a bounding volume hierarchy of 2D UV positions and indices to map 2D coordinates of the heightfield of the sample 3D representation to sub-portions of the first 3D representation, and representing the first 3D representation in the 2D heightfield based on the constructing (e.g., utilizing "PIFu uvBVH" data—a BVH of 2D UV positions and indices).

Figure 15:
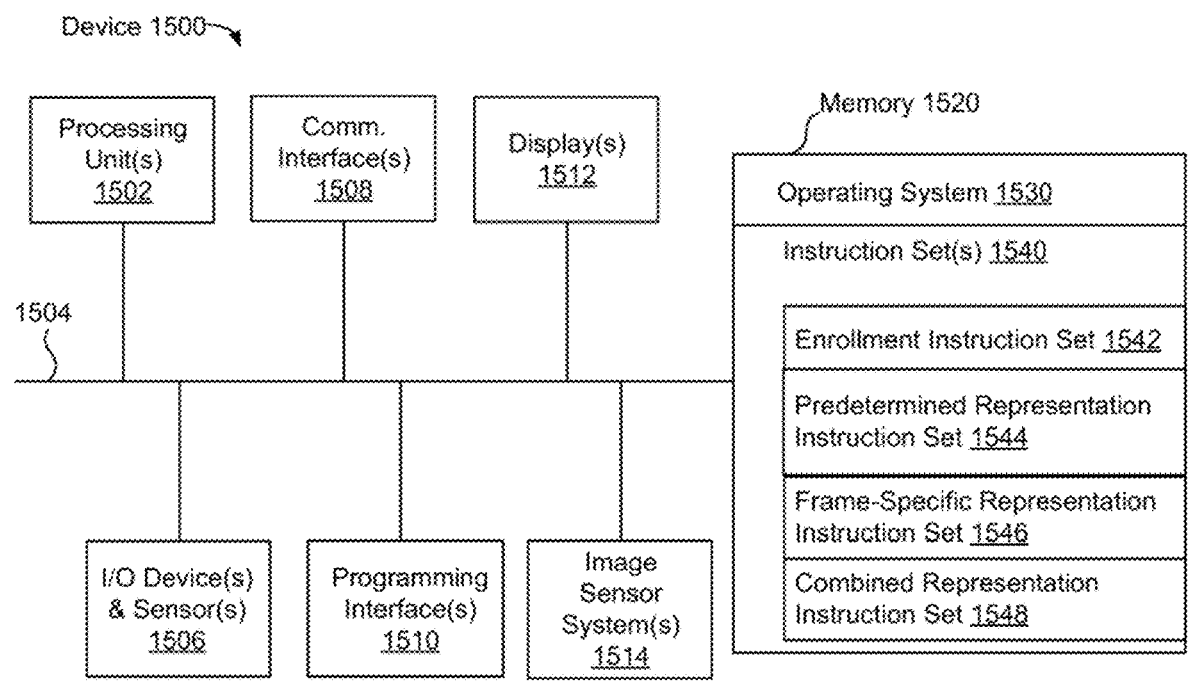
FIG. 15 is a block diagram illustrating device components of an exemplary device according to some implementations.

FIG. 15 is a block diagram of an example device 1500. Device 1500 illustrates an exemplary device configuration for devices described herein (e.g., device 10, device 965, etc.). While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1500 includes one or more processing units 1502 (e.g., microprocessors, ASICs, FPGAs, GPUs, CPUs, processing cores, and/or the like), one or more input/output (I/O) devices and sensors 1506, one or more communication interfaces 1508 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 120, and/or the like type interface), one or more programming (e.g., I/O) interfaces 1510, one or more displays 1512, one or more interior and/or exterior facing image sensor systems 1514, a memory 1520, and one or more communication buses 1504 for interconnecting these and various other components.

In some implementations, the one or more communication buses 1504 include circuitry that interconnects and controls communications between system components. In some implementations, the one or more I/O devices and sensors 1506 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 1512 are configured to present a view of a physical environment or a graphical environment to the user. In some implementations, the one or more displays 1512 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 1512 correspond to diffractive, reflective, polarized, holographic, etc. waveguide displays. In one example, the device 10 includes a single display. In another example, the device 10 includes a display for each eye of the user.

In some implementations, the one or more image sensor systems 1514 are configured to obtain image data that corresponds to at least a portion of the physical environment 105. For example, the one or more image sensor systems 1514 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1514 further include illumination sources that emit light, such as a flash. In various implementations, the one or more image sensor systems 1514 further include an on-camera image signal processor (ISP) configured to execute a plurality of processing operations on the image data.

The memory 1520 includes high-speed random-access memory, such as DRAM, SRAM, DDR RAM, or other random-access solid-state memory devices. In some implementations, the memory 1520 includes non-volatile memory, such as one or more magnetic disk storage devices, optical disk storage devices, flash memory devices, or other non-volatile solid-state storage devices. The memory 1520 optionally includes one or more storage devices remotely located from the one or more processing units 1502. The memory 1520 includes a non-transitory computer readable storage medium.

In some implementations, the memory 1520 or the non-transitory computer readable storage medium of the memory 1520 stores an optional operating system 1530 and one or more instruction set(s) 1540. The operating system 1530 includes procedures for handling various basic system services and for performing hardware dependent tasks. In some implementations, the instruction set(s) 1540 include executable software defined by binary information stored in the form of electrical charge. In some implementations, the instruction set(s) 1540 are software that is executable by the one or more processing units 1502 to carry out one or more of the techniques described herein.

The instruction set(s) 1540 include an enrollment instruction set 1542, a predetermined representation instruction set 1544, a frame-specific representation instruction set 1546, and a combined representation instruction set 1548. The instruction set(s) 1540 may be embodied a single software executable or multiple software executables.

In some implementations, the enrollment instruction set 1542 is executable by the processing unit(s) 1502 to generate enrollment data from image data. The enrollment instruction set 1542 (e.g., enrollment instruction set 820 of FIG. 8) may be configured to provide instructions to the user in order to acquire image information to generate the enrollment personification (e.g., enrollment image data 824) and determine whether additional image information is needed to generate an accurate enrollment personification to be used by the avatar display process. To these ends, in various implementations, the instruction includes instructions and/or logic therefor, and heuristics and metadata therefor.

In some implementations, the predetermined representation instruction set 1544 (e.g., predetermined representation instruction set 830 of FIG. 8) is executable by the processing unit(s) 1502 to generate a 3D representation of the user (e.g., PI Fu data) based on the enrollment data by using one or more of the techniques discussed herein or as otherwise may be appropriate. To these ends, in various implementations, the instruction includes instructions and/or logic therefor, and heuristics and metadata therefor.

In some implementations, the frame-specific representation instruction set 1546 (e.g., frame-specific representation instruction set 840 of FIG. 8) is executable by the processing unit(s) 1502 to parameterize a user's facial features and eye gaze characteristics (e.g., generate appearance values and depth values) by using one or more of the techniques discussed herein or as otherwise may be appropriate. To these ends, in various implementations, the instruction includes instructions and/or logic therefor, and heuristics and metadata therefor.

In some implementations, the combined representation instruction set 1548 (e.g., combined representation instruction set 850 of FIG. 8) is executable by the processing unit(s) 1502 to generate and display a combined representation of the face (e.g., a 3D avatar) of the user based on the predetermined representation (e.g., PI Fu data) and the second set of data (e.g., parameterization data). To these ends, in various implementations, the instruction includes instructions and/or logic therefor, and heuristics and metadata therefor.

Although the instruction set(s) 1540 are shown as residing on a single device, it should be understood that in other implementations, any combination of the elements may be located in separate computing devices. Moreover, FIG. 15 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 16:
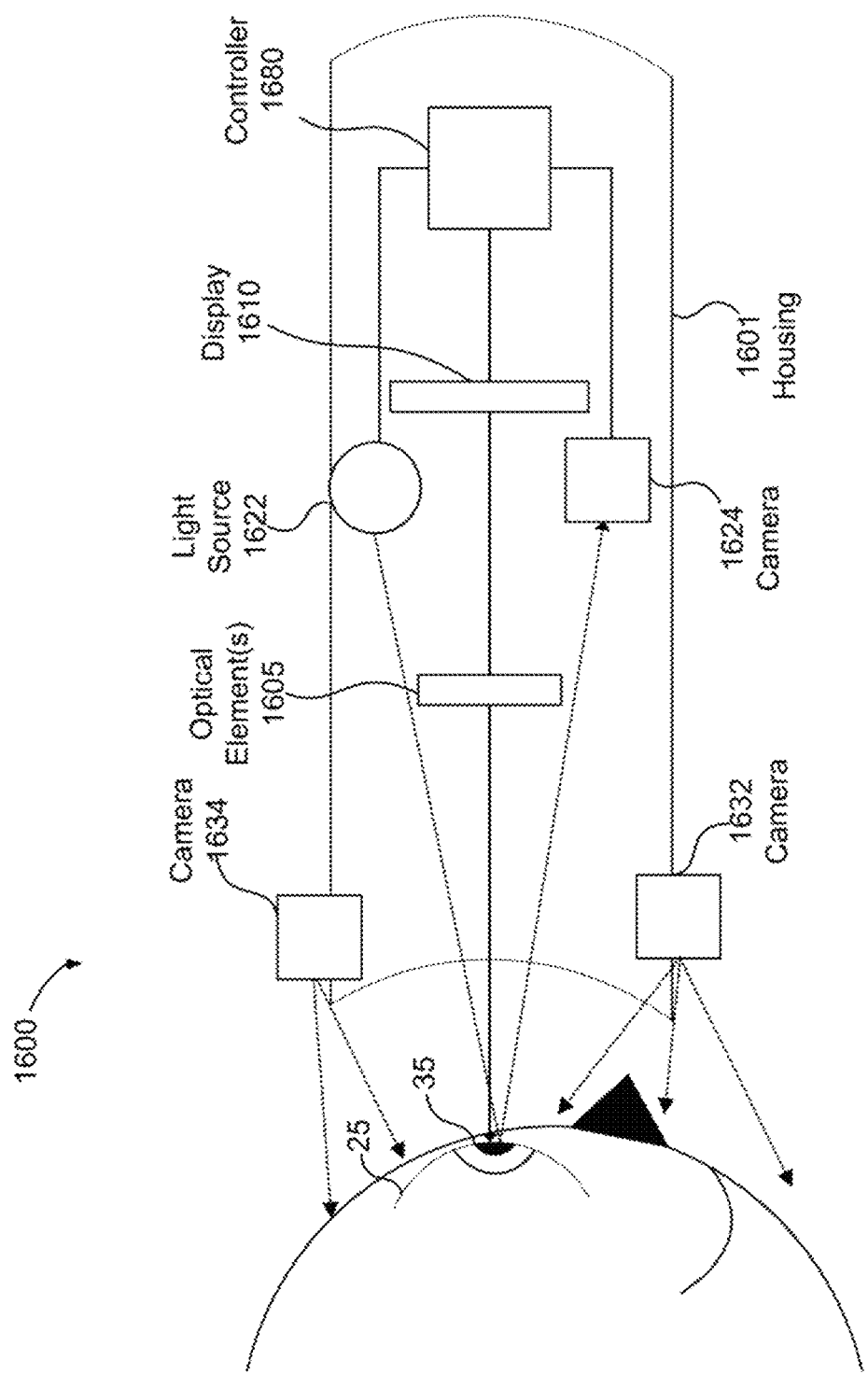
FIG. 16 is a block diagram of an example head-mounted device (HMD) in accordance with some implementations.

FIG. 16 illustrates a block diagram of an exemplary head-mounted device 1600 in accordance with some implementations. The head-mounted device 1600 includes a housing 1601 (or enclosure) that houses various components of the head-mounted device 1600. The housing 1601 includes (or is coupled to) an eye pad (not shown) disposed at a proximal (to the user 25) end of the housing 1601. In various implementations, the eye pad is a plastic or rubber piece that comfortably and snugly keeps the head-mounted device 1600 in the proper position on the face of the user 25 (e.g., surrounding the eye of the user 25).

The housing 1601 houses a display 1610 that displays an image, emitting light towards or onto the eye of a user 25. In various implementations, the display 1610 emits the light through an eyepiece having one or more optical elements 1605 that refracts the light emitted by the display 1610, making the display appear to the user 25 to be at a virtual distance farther than the actual distance from the eye to the display 1610. For example, optical element(s) 1605 may include one or more lenses, a waveguide, other diffraction optical elements (DOE), and the like. For the user 25 to be able to focus on the display 1610, in various implementations, the virtual distance is at least greater than a minimum focal distance of the eye (e.g., 7 cm). Further, in order to provide a better user experience, in various implementations, the virtual distance is greater than 1 meter.

The housing 1601 also houses a tracking system including one or more light sources 1622, camera 1624, camera 1632, camera 1634, and a controller 1680. The one or more light sources 1622 emit light onto the eye of the user 25 that reflects as a light pattern (e.g., a circle of glints) that can be detected by the camera 1624. Based on the light pattern, the controller 1680 can determine an eye tracking characteristic of the user 25. For example, the controller 1680 can determine a gaze direction and/or a blinking state (eyes open or eyes closed) of the user 25. As another example, the controller 1680 can determine a pupil center, a pupil size, or a point of regard. Thus, in various implementations, the light is emitted by the one or more light sources 1622, reflects off the eye of the user 25, and is detected by the camera 1624. In various implementations, the light from the eye of the user 25 is reflected off a hot mirror or passed through an eyepiece before reaching the camera 1624.

The display 1610 emits light in a first wavelength range and the one or more light sources 1622 emit light in a second wavelength range. Similarly, the camera 1624 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 25 selects an option on the display 1610 by looking at it), provide foveated rendering (e.g., present a higher resolution in an area of the display 1610 the user 25 is looking at and a lower resolution elsewhere on the display 1610), or correct distortions (e.g., for images to be provided on the display 1610). In various implementations, the one or more light sources 1622 emit light towards the eye of the user 25 which reflects in the form of a plurality of glints.

In various implementations, the camera 1624 is a frame/shutter-based camera that, at a particular point in time or multiple points in time at a frame rate, generates an image of the eye of the user 25. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 1624 is an event camera including a plurality of light sensors (e.g., a matrix of light sensors) at a plurality of respective locations that, in response to a particular light sensor detecting a change in intensity of light, generates an event message indicating a particular location of the particular light sensor.

In various implementations, the camera 1632 and camera 1634 are frame/shutter-based cameras that, at a particular point in time or multiple points in time at a frame rate, can generate an image of the face of the user 25. For example, camera 1632 captures images of the user's face below the eyes, and camera 1634 captures images of the user's face above the eyes. The images captured by camera 1632 and camera 1634 may include light intensity images (e.g., RGB) and/or depth image data (e.g., Time-of-Flight, infrared, etc.).

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device with respect to interacting with electronic content. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve interaction and control capabilities of an electronic device. Accordingly, use of such personal information data enables calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access his or her stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
at a processor of a device:
obtaining a predetermined three-dimensional (3D) representation of at least a first portion of a user, wherein the predetermined 3D representation is associated with a 3D reference point defined relative to a skeletal representation of the user;
obtaining a sequence of frame-specific 3D representations corresponding to multiple instants in a period of time, each of the frame-specific 3D representations representing a second portion of the user at a respective instant of the multiple instants in the period of time and each of the frame-specific 3D representations associated with the 3D reference point; and
generating combined 3D representations of the user for the multiple instants in the period of time, wherein each of the combined 3D representations is generated by combining the predetermined 3D representation with a respective frame-specific 3D representation based on an alignment, wherein the alignment is based on the 3D reference point.

2. The method of claim 1, wherein the second portion of the user is a sub-portion of the first portion.

3. The method of claim 2, wherein:
the first portion of the user comprises a face portion and an additional portion of the user; and
the second portion of the user comprises the face portion without the additional portion of the user.

4. The method of claim 1, wherein the 3D reference point is associated with a 3D position of an atlas joint of a skeletal representation of the user.

5. The method of claim 4, wherein the 3D reference point is associated with a center of eyes of the user defined at a position at an offset from the atlas joint.

6. The method of claim 1, wherein combining the predetermined 3D representation with the respective frame-specific 3D representations comprises adjusting a sub-portion of the predetermined 3D representation.

7. The method of claim 6, wherein adjusting the sub-portion of the predetermined 3D representation comprises adjusting positions of vertices of the predetermined 3D representation and applying texture based on each of the frame-specific 3D representations.

8. The method of claim 1, wherein each of the frame-specific 3D representations is defined using height values specified within a heightfield that is positionally associated with the 3D reference point.

9. The method of claim 8, wherein vertices of the predetermined 3D representation are mapped to positions on the heightfield and associated with height values, wherein the vertices are mapped based on the 3D reference point.

10. The method of claim 9, wherein combining the predetermined 3D representation with each of the frame-specific 3D representations comprises adjusting at least some of the height values associated with the vertices based on the height values specified for the respective frame-specific 3D representation.

11. The method of claim 10, wherein adjusting the vertices comprises blending, using specified alpha values, at least some of the height values associated with the vertices with the height values specified for the respective the frame-specific 3D representation.

12. The method of claim 11, wherein adjusting the vertices comprises blending, using the specified alpha values, at least some texture values associated with the vertices with texture values specified for the respective frame-specific representation.

13. The method of claim 1, wherein the first portion represented by the predetermined 3D representation represents an upper body and a head of the user.

14. The method of claim 1, wherein the predetermined 3D representation is generated using a pixel-aligned implicit function (PI Fu) technique that locally aligns pixels of 2D enrollment images with a global context to form the predetermined 3D representation.

15. The method of claim 1, wherein each of the frame-specific 3D representations is generated based on sensor data from an inward or down-facing camera and enrollment data, wherein the enrollment data comprises images of the second portion of the user exhibiting a plurality of different facial expressions.

16. The method of claim 1, wherein each of the frame-specific 3D representations comprises a configuration of a skeletal representation of the user at a respective instant of the multiple instants in the period of time, wherein the 3D reference point is defined based on a node of the skeletal representation.

17. The method of claim 1, further comprising:
rendering a view of the combined 3D representations.

18. The method of claim 17, wherein the rendering occurs during a communication session in which a second device captures sensor data and provides the sequence of frame-specific 3D representations corresponding to the multiple instants in the period time based on the sensor data.

19. The method of claim 18, wherein the second device provides the predetermined 3D representation of the user during the communication session.

20. The method of claim 18, wherein the second device generates the combined 3D representation of the user and provides the combined 3D representation to the device during the communication session.

21. The method of claim 1, wherein views of the combined 3D representations are displayed on the device in real-time relative to the multiple instants in the period of time.

22. The method of claim 1, wherein the device is a head-mounted device (HMD).

23. A device comprising:
a non-transitory computer-readable storage medium; and
one or more processors coupled to the non-transitory computer-readable storage medium, wherein the non-transitory computer-readable storage medium comprises program instructions that, when executed on the one or more processors, cause the one or more processors to perform operations comprising:
obtaining a predetermined three-dimensional (3D) representation of at least a first portion of a user, wherein the predetermined 3D representation is associated with a 3D reference point defined relative to a skeletal representation of the user;

obtaining a sequence of frame-specific 3D representations corresponding to multiple instants in a period of time, each of the frame-specific 3D representations representing a second portion of the user at a respective instant of the multiple instants in the period of time and each of the frame-specific 3D representations associated with the 3D reference point; and generating combined 3D representations of the user for the multiple instants in the period of time, wherein each of the combined 3D representations is generated by combining the predetermined 3D representation with a respective frame-specific 3D representation based on an alignment, wherein the alignment is based on the 3D reference point.

24. The device of claim 23, wherein the second portion of the user is a sub-portion of the first portion.

25. A non-transitory computer-readable storage medium, storing program instructions executable on a device including one or more processors to perform operations comprising:

obtaining a predetermined three-dimensional (3D) representation of at least a first portion of a user, wherein the predetermined 3D representation is associated with a 3D reference point defined relative to a skeletal representation of the user;

obtaining a sequence of frame-specific 3D representations corresponding to multiple instants in a period of time, each of the frame-specific 3D representations representing a second portion of the user at a respective instant of the multiple instants in the period of time and each of the frame-specific 3D representations associated with the 3D reference point; and generating combined 3D representations of the user for the multiple instants in the period of time, wherein each of the combined 3D representations is generated by combining the predetermined 3D representation with a respective frame-specific 3D representation based on an alignment, wherein the alignment is based on the 3D reference point.

* * * * *